US008837821B2

(12) United States Patent
Hirota et al.

(10) Patent No.: US 8,837,821 B2
(45) Date of Patent: Sep. 16, 2014

(54) IMAGE PROCESSING APPARATUS, IMAGE PROCESSING METHOD, AND COMPUTER READABLE RECORDING MEDIUM

(75) Inventors: Masashi Hirota, Hachioji (JP); Yamato Kanda, Hino (JP); Makoto Kitamura, Hachioji (JP); Takehiro Matsuda, Hachioji (JP); Takashi Kono, Tachikawa (JP)

(73) Assignee: Olympus Corporation, Tokyo (JP)

( * ) Notice: Subject to any disclaimer, the term of this patent is extended or adjusted under 35 U.S.C. 154(b) by 495 days.

(21) Appl. No.: 13/100,667

(22) Filed: May 4, 2011

(65) Prior Publication Data
US 2011/0311133 A1 Dec. 22, 2011

(30) Foreign Application Priority Data

May 11, 2010 (JP) .................................. 2010-109472

(51) Int. Cl.
*G06K 9/34* (2006.01)
*G06T 7/00* (2006.01)
(52) U.S. Cl.
CPC .............. *G06T 7/0079* (2013.01); *G06T 7/0012* (2013.01)
USPC ........................................................ 382/164
(58) Field of Classification Search
USPC ............ 382/128, 164, 165, 199, 203; 348/43, 348/45, 65, 68; 600/118
See application file for complete search history.

(56) References Cited

U.S. PATENT DOCUMENTS

2008/0292154 A1* 11/2008 Nishimura et al. ........... 382/128

FOREIGN PATENT DOCUMENTS

| JP | 2005-192880 A | 7/2005 |
| JP | 2006-166939 | 6/2006 |
| JP | 2007-244518 A | 9/2007 |
| JP | 2007-282857 A | 11/2007 |
| JP | 2008-93172 A | 4/2008 |
| WO | 2007/119297 A1 | 10/2007 |
| WO | 2008/155828 A1 | 12/2008 |

OTHER PUBLICATIONS

Notice of Rejection dated Nov. 26, 2013 from related Japanese Application No. 2010-109472, together with an English language translation.

* cited by examiner

*Primary Examiner* — Duy M Dang
(74) *Attorney, Agent, or Firm* — Scully, Scott, Murphy & Presser, P.C.

(57) ABSTRACT

An image processing apparatus includes: a first judging unit that determines an unnecessary candidate region, on a basis of first feature data based on color information of an intraluminal image; and a second judging unit that judges whether the unnecessary candidate region is an unnecessary region, based on second feature data, which is different from the first feature data, of the unnecessary candidate region.

8 Claims, 14 Drawing Sheets

# IMAGE PROCESSING APPARATUS, IMAGE PROCESSING METHOD, AND COMPUTER READABLE RECORDING MEDIUM

CROSS-REFERENCE TO RELATED APPLICATIONS

This application is based upon and claims the benefit of priority from Japanese Patent Application No. 2010-109472, filed on May 11, 2010, the entire contents of which are incorporated herein by reference.

BACKGROUND OF THE INVENTION

1. Field of the Invention

The present invention relates to an image processing apparatus, an image processing method, and a computer-readable recording medium for processing an intraluminal image capturing an image of the inside of a lumen.

2. Description of the Related Art

Conventionally, endoscopes are popularly used as a medical observation apparatus introduced into the body of an examined subject (hereinafter, "subject") such as a patient, to observe the inside of a lumen in the body. Also, in recent years, swallowed endoscopes (capsule endoscopes) have been developed that include, within a capsule-shaped casing, an image capturing device and a communication device that wirelessly transmits image data captured by the image capturing device to the outside of the body of the subject. It requires much experience to observe an image of the inside of the lumen in the subject's body (an intraluminal image) captured by such a medical observation apparatus and to make a diagnosis. Thus, medical diagnosis aiding functions that support medical doctors making a diagnosis are in demand. As an image recognition technique to realize such a function, a technique has been proposed by which an abnormal part such as a lesion is automatically detected from an intraluminal image so as to indicate an image on which an attention should be paid in a diagnosis.

To detect the abnormal part as described above, it is important to use a technique for performing, as pre-processing, a process of extracting unnecessary regions that are unnecessary for making a medical observation/diagnosis (e.g., a halation region in which a halation occurred, a dark part region showing the far side of the lumen, a contents region showing the contents such as the stool) and specifying a region that should be focused on such as a mucous membrane. For example, Japanese Patent Application Laid-open No. 2006-166939 discloses a technique for detecting, within an image, presence of a specific biological mucous membrane such as a lesion mucous membrane, without being affected by unnecessary regions such as a dark part. According to this publication, after some pixels corresponding to the unnecessary regions are eliminated based on color information of the pixels, the presence of the specific biological mucous membrane is detected.

SUMMARY OF THE INVENTION

An image processing apparatus according to the present invention that extracts an unnecessary region from an intraluminal image, includes: a first judging unit that determines an unnecessary candidate region, on a basis of first feature data based on color information of the intraluminal image; and a second judging unit that judges whether the unnecessary candidate region is the unnecessary region, based on second feature data, which is different from the first feature data, of the unnecessary candidate region.

An image processing method according to the present invention for extracting an unnecessary region from an intraluminal image, includes: determining an unnecessary candidate region on a basis of first feature data based on color information of the intraluminal image; and judging whether the unnecessary candidate region is the unnecessary region, based on second feature data, which is different from the first feature data, of the unnecessary candidate region.

A non-transitory computer-readable recording medium according to the present invention stores thereon an executable program, wherein the program instructs a processor to perform: determining an unnecessary candidate region on a basis of first feature data based on color information of the intraluminal image; and judging whether the unnecessary candidate region is the unnecessary region, based on second feature data, which is different from the first feature data, of the unnecessary candidate region.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
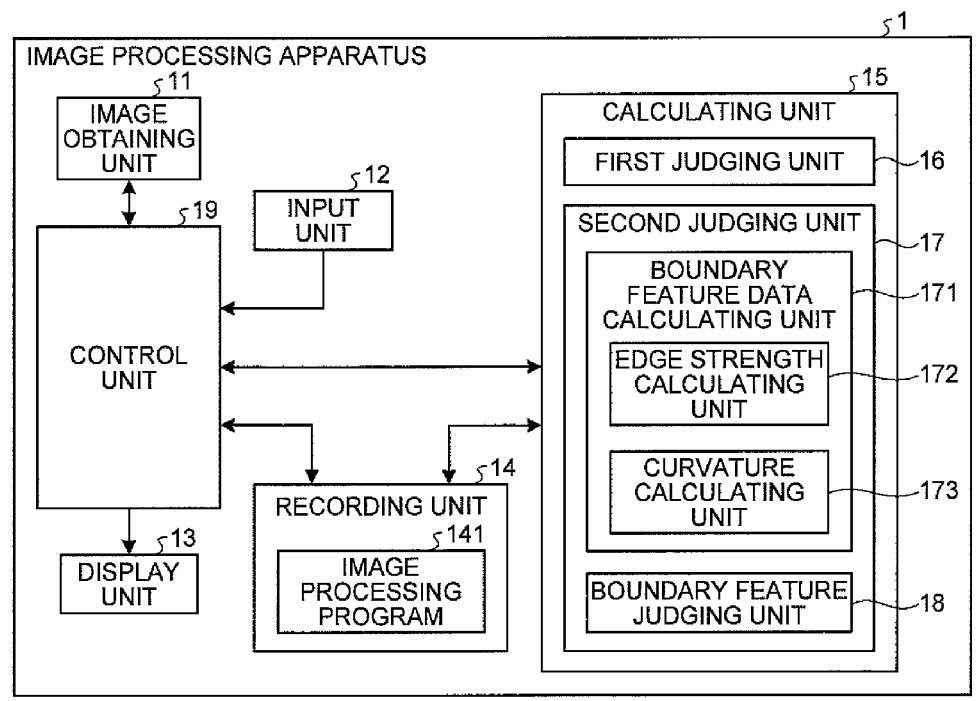
FIG. 1 is a block diagram explaining a functional configuration of an image processing apparatus according to a first embodiment of the present invention.

In the following sections, exemplary embodiments of the present invention will be explained, with reference to the accompanying drawings. The present invention is not limited by the exemplary embodiments. In the drawings, the same elements are referred to by using the same reference symbols.

An image processing apparatus according to an aspect of the exemplary embodiments processes an image (an intraluminal image) obtained by a medical observation apparatus such as an endoscope or a capsule endoscope by capturing an image of the inside of a lumen such as a digestive tract in the body of a subject. More specifically, the image processing apparatus performs a process of extracting unnecessary regions from the intraluminal image, as pre-processing of the process to specify a region that should be focused on such as a mucous membrane ("focused region") and to extract an abnormal part region such as a lesion region or a bleeding region. The "unnecessary region" denotes a region that is not able to serve as a focused region and is unnecessary for making a medical observation/diagnosis. Examples of the "unnecessary region" include a halation region, a dark part region, and a contents region. The "halation region" refers to a region in which a halation occurred. As explained above, the "intraluminal image" is an image obtained by a medical observation apparatus by capturing an image of the inside of a lumen such as a digestive tract. The far side of a lumen appears in an intraluminal image as a dark part region, because the distance from the medical observation apparatus is long and it is difficult for illuminating light to reach such a region. The "dark part region" refers to such a dark region showing the far side of the lumen. The "contents region" refers to a region showing the lumen contents moving around therein (e.g., the stool). According to an aspect of the exemplary embodiments, the intraluminal image captured by a medical observation apparatus is, for example, a color image that has, for each of the pixels, pixel levels (pixel values) corresponding to color components of red (R), green (G), and blue (B).

First Embodiment

First, a configuration of an image processing apparatus according to a first embodiment of the present invention will be explained. FIG. 1 is a block diagram explaining a functional configuration of an image processing apparatus 1 according to the first embodiment. As shown in FIG. 1, the image processing apparatus 1 according to the first embodiment includes an image obtaining unit 11, an input unit 12, a display unit 13, a recording unit 14, a calculating unit 15, and a control unit 19 that controls an overall operation of the image processing apparatus 1. The image processing apparatus 1 performs a process of extracting halation regions as unnecessary regions, from an intraluminal image.

The image obtaining unit 11 obtains image data of the intraluminal image captured by a medical observation apparatus. The image data obtained by the image obtaining unit 11 is recorded into the recording unit 14 and processed by the calculating unit 15, before being displayed on the display unit 13, as necessary and as appropriate. When the medical observation apparatus is a capsule endoscope where a portable recording medium is used for transferring image data to and from the medical observation apparatus, the image obtaining unit 11 is configured with a reader that reads the image data of the intraluminal image stored in the recording medium detachably attached thereto. Alternatively, when a server that stores therein the image data of the intraluminal image captured by the medical observation apparatus is provided in an appropriate place so that the image data is obtained from the server, the image obtaining unit 11 is configured with a communication apparatus or the like that establishes a connection to the server. In that situation, data communication is performed with the server via the image obtaining unit 11 to obtain the image data of the intraluminal image. As another example, the image obtaining unit 11 may be configured with an interface device or the like that receives, via a cable, an input of an image signal from the medical observation apparatus such as an endoscope.

The input unit 12 is realized with, for example, a keyboard, a mouse, a touch panel, various types of switches, and the like and outputs an input signal to the control unit 19. The display unit 13 is realized with a display device such as a Liquid Crystal Display (LCD) or an Electroluminescent (EL) display. Under control of the control unit 19, the display unit 13 displays various types of screens including the intraluminal image.

The recording unit 14 is realized with any of various types of Integrated Circuit (IC) Memories (e.g., Read-Only Memories (ROMs), Random Access Memories (RAMs)) such as flash memories of which the recording is updatable, a hard disk that is built therein or connected by a data communication terminal, and an information recording medium such as a Compact Disk Read-Only Memory (CD-ROM) and a reading device therefor. The recording unit 14 records therein computer programs (hereinafter, "programs") for operating the image processing apparatus 1 and for realizing various functions of the image processing apparatus 1, as well as data used while such programs are executed. For example, the recording unit 14 records therein the image data of the intraluminal image obtained by the image obtaining unit 11. Also, the recording unit 14 records therein an image processing program 141 for extracting halation regions from the intraluminal image.

The calculating unit 15 is realized with hardware such as a Central Processing unit (CPU) and performs various types of calculating processes to extract the halation regions by processing the intraluminal image. The calculating unit 15 includes a first judging unit 16 and a second judging unit 17. The first judging unit 16 determines a halation candidate region, which is an example of unnecessary candidate regions, on the basis of color feature data, which is first feature data based on color information of the intraluminal image. The second judging unit 17 judges whether the halation candidate region is a halation region, based on second feature data, which is different from the color feature data. The second judging unit 17 includes a boundary feature data calculating unit 171 and a boundary feature judging unit 18. In this situation, the second feature data is a value calculated based on changes in the pixel values near the boundary of the halation candidate region. For example, in the first embodiment, the boundary feature data calculating unit 171 calculates, as the second feature data, boundary feature data of a region including regions inside and outside of the boundary of the halation candidate region. The boundary feature data calculating unit 171 includes an edge strength calculating unit 172 and a curvature calculating unit 173. The edge strength calculating unit 172 calculates an edge strength at the boundary of the halation candidate region, as one example of the boundary feature data. The curvature calculating unit 173 calculates a curvature of a normal-line-direction line profile at the boundary of the halation candidate region, as another example of the boundary feature data. The boundary feature judging unit 18 judges whether the halation candidate region is a halation region, based on the boundary feature data that is the edge strength and the curvature of the normal-line-direction line profile.

The control unit 19 is realized with hardware such as a CPU. The control unit 19 transfers, for example, instructions and data to the constituent elements of the image processing apparatus 1, based on the image data obtained by the image obtaining unit 11, the input signal input thereto from the input unit 12, and the programs and the data recorded in the recording unit 14, so as to integrally control the operation of the entirety of the image processing apparatus 1.

Figure 2:
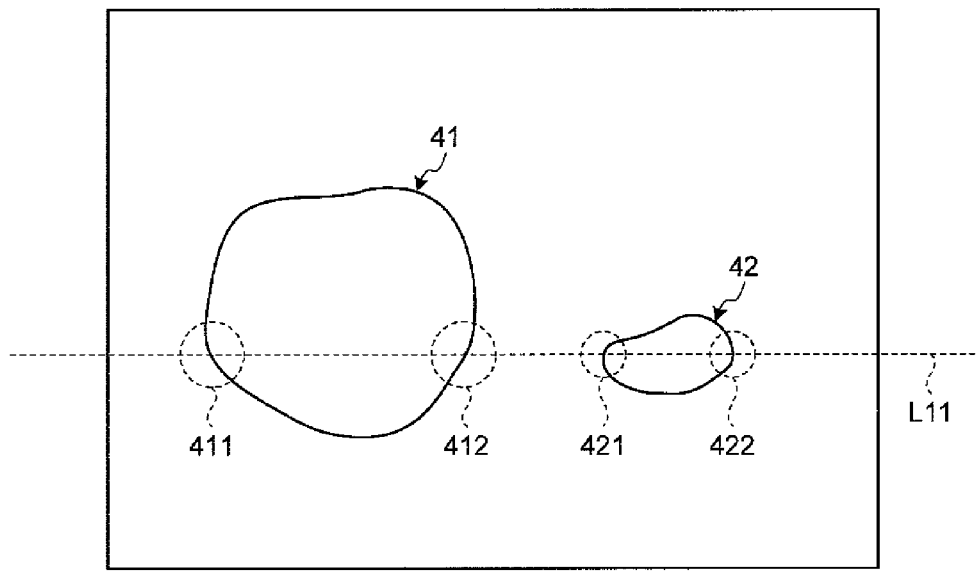
FIG. 2 is a schematic drawing of an example of an intraluminal image.
Figure 3:
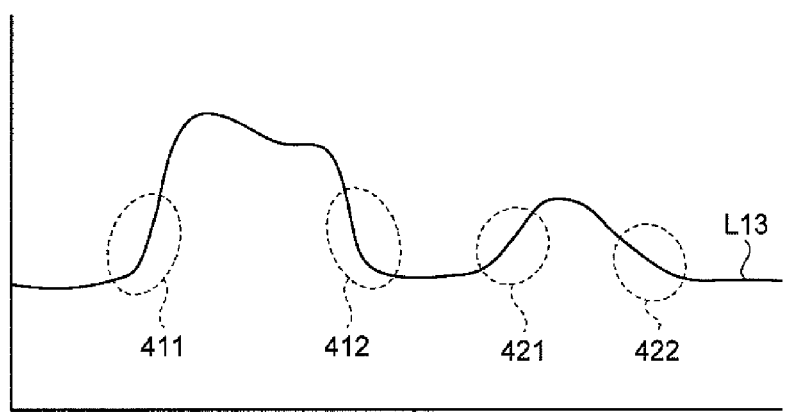
FIG. 3 is a chart explaining changes in pixel values inside an intraluminal image.

Next, a principle of a halation region extracting process according to the first embodiment will be explained. FIG. 2 is a schematic drawing of an intraluminal image. FIG. 3 is a chart explaining changes in pixel values inside an intraluminal image and shows a change curve L13 of the pixel values on a line L11 indicated with a broken line in FIG. 2. Halation regions appear as white regions in intraluminal images. For this reason, first, white regions are extracted as the halation candidate regions from the intraluminal image. For example, in the intraluminal image in FIG. 2, two halation candidate regions 41 and 42, which are white regions, are shown.

As explained above, the halation candidate regions are the white regions in the intraluminal image. In intraluminal images, however, in addition to such halation regions, regions having a white lesion or the like also appear as white regions that look similar to halation regions. Unlike the halation regions, those regions having a white lesion or the like can serve as regions that should be focused on when making a medical observation/diagnosis. For example, in FIG. 2, let us assume that one of the halation candidate regions (i.e., the halation candidate region 41) is a halation region, whereas the other (i.e., the halation candidate region 42) is a region having a white lesion.

In this situation, the halation region is a region in which attenuation of light reflected from the imaging target surface is small. The halation region has larger pixel values than regions other than the halation region. For this reason, the halation region has a characteristic where the pixel values fluctuate significantly at the boundary, being different between the region inside the boundary and the region outside the boundary. For example, as indicated by the change curve L13 of the pixel values in FIG. 3, the pixel values rapidly change at boundary portions 411 and 412 of the halation candidate region 41, which is a halation region, shown in FIG. 2. In contrast, the pixel values change gradually at boundary portions 421 and 422 of the halation candidate region 42, which is a region having a white lesion. For this reason, in the first embodiment, halation regions are extracted by judging whether each of the halation candidate regions is a halation region, by focusing on the changes in the pixel values near the boundaries of the halation candidate regions obtained by extracting the white regions.

Next, a specific processing procedure performed by the image processing apparatus 1 according to the first embodiment will be explained, with reference to FIG. 4. The process explained below is realized when the calculating unit 15 executes the image processing program 141 recorded in the recording unit 14.

Figure 4:
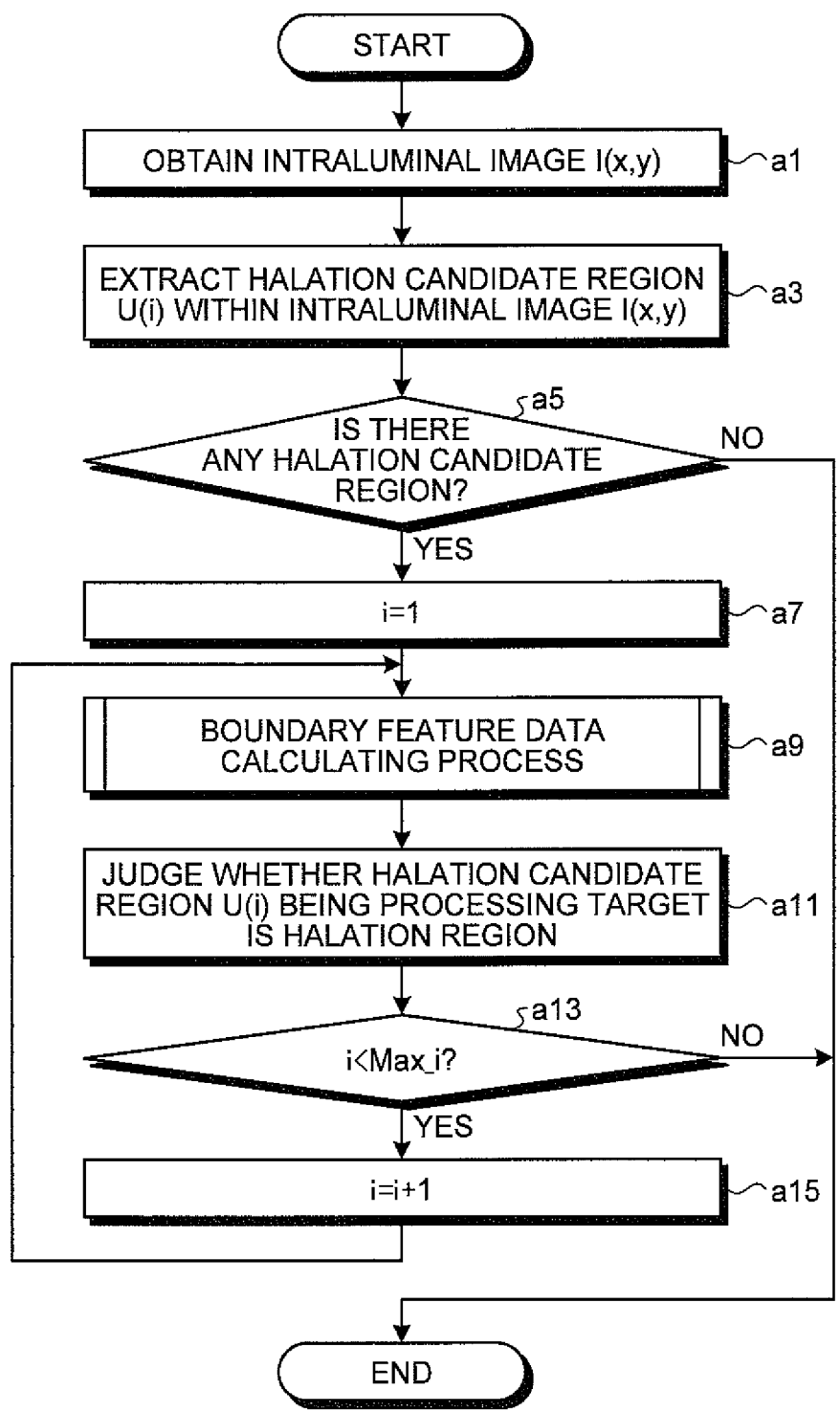
FIG. 4 is an overall flowchart of a processing procedure performed by the image processing apparatus according to the first embodiment.

As shown in FIG. 4, the calculating unit 15 first obtains an intraluminal image I(x,y) being a processing target (step a1). As a result of this process, the calculating unit 15 reads and obtains the intraluminal image I(x,y) being the processing target, which has been obtained by the image obtaining unit 11 and recorded into the recording unit 14. The characters "x" and "y" denote coordinates of pixel positions in the intraluminal image.

Subsequently, the first judging unit 16 extracts a halation candidate region U(i) within the intraluminal image I(x,y), based on the color feature data of the intraluminal image I(x,y) obtained at step a1 (step a3). As explained above, halation regions appear as white regions in intraluminal images. For this reason, in the first embodiment, color information (an R value, a G value, and a B value) of the intraluminal image is used as the color feature data so as to identify the pixels belonging to the white regions. After that, the halation candidate region U(i) is extracted by performing a publicly-known labeling process on the pixels identified as belonging to the white regions.

Next, a more specific processing procedure will be explained. For each of the pixels in the intraluminal image I(x,y), the R value, the G value, and the B value are each compared with a predetermined threshold, so as to judge whether all of the R, G, and B values are equal to or larger than the threshold. Subsequently, any pixel of which all of the R, G, and B values are judged to be equal to or larger than the threshold is considered as a pixel belonging to a white region, and a temporary pixel value "0" is assigned thereto. On the contrary, to any pixel of which at least one of the R, G, and B values is judged to be smaller than the threshold, a temporary pixel value "1" is assigned.

After that, the halation candidate regions are extracted by performing the labeling process based on the temporary pixel values assigned to the pixels in the intraluminal image I(x,y) in the manner described above (see CG-ARTS Society, Digital Gazou Shori [digital image processing], page 181). More specifically, first, the pixels having the temporary pixel value "0" are sectioned according to connecting components thereof (into pixel groups each made up of adjacently-positioned identical pixel values). By appending a unique label to each of the sectioned pixel groups so as to identify the pixel groups, each of the pixel groups having the temporary pixel value "0" is determined as a halation candidate region. In this situation, the first judging unit 16 assigns an index i to each of the halation regions so as to identify the halation regions. For example, as the index i, serial numbers (where 1≤i≤Max_i) are assigned to the halation regions, respectively, so as to obtain the halation candidate region U(i).

In the present example, the halation candidate regions are extracted by using the color information (the R value, the G value, and the B value) of each of the pixels as the color feature data; however, as long as it is possible to extract the white regions, the method is not limited to this example. As another example, it is acceptable to map the R value, the G value, and the B value of each of the pixels onto an HSI color space made up of three components such as Hue, Saturation, and Intensity (lightness or luminance) so as to compare the I value (the luminance value) with a predetermined threshold. In that situation, the halation candidate regions are extracted by identifying any pixel of which the I value is judged to be equal to or larger than the threshold as a pixel belonging to a white region and subsequently performing the labeling process in the same manner.

After that, the first judging unit 16 judges whether there is any halation candidate region in the intraluminal image I(x, y). If no halation candidate region is extracted as a result of the process at step a3, the first judging unit 16 determines that there is no halation candidate region (step a5: No), and this process is ended. On the contrary, if one or more halation candidate regions are extracted as a result of the process at step a3, the first judging unit 16 determines that there are one or more halation candidate regions (step a5: Yes), and the process proceeds to step a7.

Further, at step a7, the index i of the halation candidate region being the processing target is set to "1". After that, the boundary feature data calculating unit 171 performs a boundary feature data calculating process to calculate the boundary feature data of the halation candidate region U(i) being the processing target (step a9).

In the first embodiment, based on the characteristic of the halation region where the pixel values fluctuate significantly at the boundary, being different between the region inside the boundary and the region outside the boundary, as explained above, the boundary feature data is calculated as a criterion used for judging whether the halation candidate region U(i) is a halation region. Further, based on the boundary feature data, the halation regions and the regions having a white lesion or the like, both of which appear as white regions and are in similar colors, are distinguished from each other.

Figure 5:
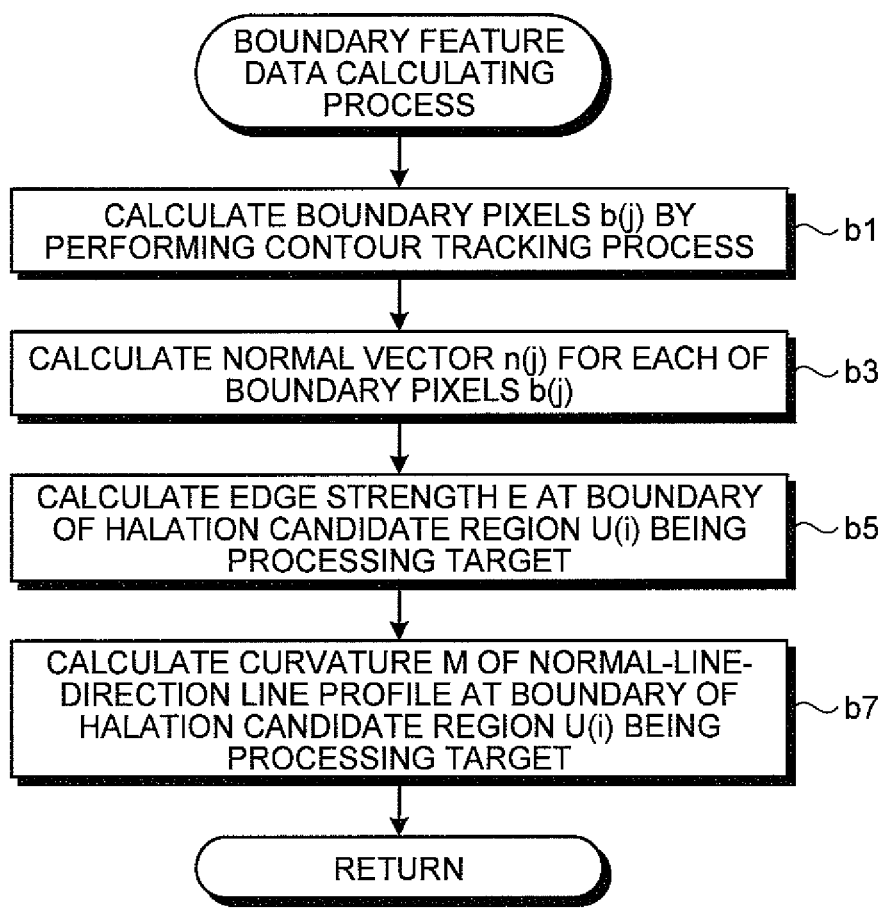
FIG. 5 is a flowchart of a detailed processing procedure of a boundary feature data calculating process.

FIG. 5 is a flowchart of a detailed processing procedure of the boundary feature data calculating process. As shown in FIG. 5, during the boundary feature data calculating process, the boundary feature data calculating unit 171 first performs a publicly-known contour tracking process to detect pixels b(j) (hereinafter, "boundary pixels") corresponding to the boundary of the halation candidate region U(i) being the processing target (step b1). The contour tracking process is a method for detecting the boundary pixels by sequentially tracking the pixels corresponding to an outer circumferential part of the region. In the present example, for instance, the contour tracking process is performed by judging connectivity with eight neighboring pixels (see CG-ARTS Society, Digital Gazou Shori [digital image processing], page 178). In this situation, "j" is an index for identifying each of the boundary pixels and indicates an adjacent relationship among the boundary pixels.

Further, according to Expressions (1) and (2) below, the boundary feature data calculating unit 171 calculates, for each of the boundary pixels b(j), a normal vector n(j) with respect to the boundary of the halation candidate region U(i) being the processing target (step b3). In Expressions (1) and (2), $n_x(j)$ denotes an x component of the normal vector n(j), whereas $n_y(j)$ denotes a y component of the normal vector n(j). Further, $b_x(j)$ denotes an x coordinate of the boundary pixel b(j), whereas $b_y(j)$ denotes a y coordinate of the boundary pixel b(j). In this situation, the contour tracking process mentioned above is a process to track clockwise the pixels corresponding to the outer circumferential part of the halation candidate region U(i). Thus, the normal vector is obtained as being oriented toward the outside of the halation candidate region U(i).

$$n_x(j) = b_y(j+1) - b_y(j-1) \quad (1)$$

$$n_y(j) = -(b_x(j+1) - b_x(j-1)) \quad (2)$$

After that, based on the normal vector n(j) calculated for each of the boundary pixels b(j) at step b3, the edge strength calculating unit 172 calculates edge strengths at the boundary of the halation candidate region U(i) being the processing target (step b5). More specifically, the edge strength calculating unit 172 calculates an edge strength E, according to Expressions (3) to (7) below. In Expressions (3) to (7), $I_R(x,y)$ denotes the R value of the pixel at each of the pixel positions expressed by the coordinates $(x_1, y_1)$ and $(x_2, y_2)$ within the intraluminal image I(x,y). "Nb" denotes the total number of boundary pixels (b) j, whereas $k_1$ is an arbitrary constant.

Further, $x_1, x_2, y_1$, and $y_2$ are each an integer. When $x_1, x_2, y_1$, and $y_2$ are calculated, each value is rounded to the nearest integer.

$$E = \frac{1}{Nb} \sum_{j=1}^{Nb} I_R(x_1, y_1) - I_R(x_2, y_2) \quad (3)$$

where $x_1 = b_x(j) + k_1 \cdot n_x(j)$ (4)

$y_1 = b_y(j) + k_1 \cdot n_y(j)$ (5)

$x_2 = b_x(j) - k_1 \cdot n_x(j)$ (6)

$y_2 = b_y(j) - k_1 \cdot n_y(j)$ (7)

In the present example, the edge strength E is calculated at the boundary of the halation candidate region U(i) by using the normal vector; however, the method for calculating the edge strength is not limited to this example. As another example, it is acceptable to calculate the edge strength by using a publicly-known Sobel filter (see CG-ARTS Society, Digital Gazou Shori [digital image processing], page 116). The Sobel filter is a conventionally-known method for performing a differential process and a smoothing process. Also, in the present example, the edge strength E is calculated for each of all the boundary pixels b(j); however, the number of portions of the boundary at which the edge strength E is calculated may be one or larger. In other words, it is possible to select, as appropriate, the portions at which the edge strength E is to be calculated (i.e., which of the boundary pixels b(j), the edge strength E is to be calculated for), so that the edge strength E is calculated for each of the selected portions of the boundary.

Subsequently, based on the normal vector n(j) calculated for each of the boundary pixels b(j) at step b3, the curvature calculating unit 173 calculates a curvature of a normal-line-direction line profile at the boundary of the halation candidate region U(i) being the processing target (step b7).

Figure 6:
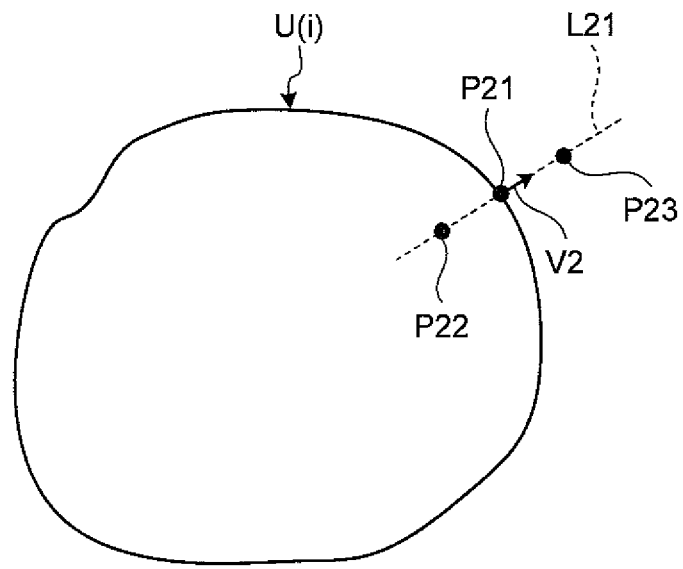
FIG. 6 is a schematic drawing of an example of a halation candidate region.
Figure 7:
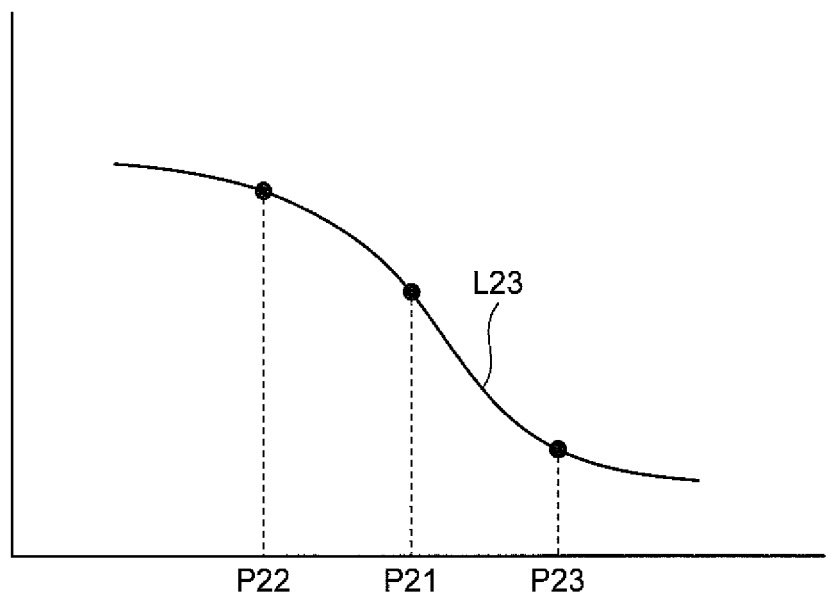
FIG. 7 is a chart of an example of a normal-line-direction line profile at a boundary of the halation candidate region shown in FIG. 6.

Next, a principle for calculating the curvature of the normal-line-direction line profile will be explained. FIG. 6 is a schematic drawing of an example of the halation candidate region U(i) being the processing target. In FIG. 6, a vector V2, which is a normal vector n(j) calculated at step b3 in FIG. 5 is shown with respect to P21, which is an example of the boundary pixels b(j) positioned on the boundary of the halation candidate region U(i). FIG. 7 is a chart of a change curve L23 of the pixel values along a line L21 in FIG. 6, while the horizontal axis expresses the pixel positions on the Line 21 indicated with a broken line in FIG. 6, whereas the vertical axis expresses the pixel values of the corresponding pixels. In the first embodiment, the normal-line-direction line profile denotes changes in the pixel values of a pixel positioned in the normal line direction of a boundary pixels. For example, the normal-line-direction line profile of the boundary pixel P21 shown in FIG. 6 is the change curve L23 shown in FIG. 7, i.e., the changes in the pixel values on the line L21 along the normal vector V2. After that, at step b7 in FIG. 5, based on the curvature of the normal-line-direction line profile of each of the boundary pixels, the curvature of the normal-line-direction line profile at the boundary of the halation candidate region U(i) being the processing target is calculated. The curvature of the normal-line-direction line profile of each of the boundary pixels is calculated as follows: For example, with regard to the boundary pixel P21, the pixel value of the boundary pixel P21 and the pixel values of the pixels P22 and P23 are used in the calculation. The pixels P22 and P23 are pixels on the line L21 extending along the normal vector V2 and are positioned on either side of the boundary pixel P21.

In actuality, at step b7 in FIG. 5, the curvature calculating unit 173 calculates a curvature M of the normal-line-direction line profile by using Expression (8) shown below. The values of $x_1$, $x_2$, $y_1$, and $y_2$ used in Expression (8) are the same as the values obtained with Expressions (4) to (7) above.

$$M = \frac{1}{Nb} \sum_{j=1}^{Nb} \frac{I_R(x_1, y_1) - 2I_R(n_x(j), n_y(j)) + I_R(x_2, y_2)}{(1 + (I_R(x_1, y_1) - I_R(x_2, y_2))^2)^{\frac{3}{2}}} \quad (8)$$

When the curvature M of the normal-line-direction line profile is calculated, the process returns to step a9 in FIG. 4, before proceeding to step a11. As a result of the boundary feature data calculating process, the edge strength E and the curvature M of the normal-line-direction line profile at the boundary of the halation candidate region U(i) being the processing target are obtained, as the boundary feature data of the halation candidate region U(i) being the processing target.

In the present example, the curvature M of the normal-line-direction line profile is calculated for each of all the boundary pixels b(j); however, the number of portions of the boundary at which the curvature M of the normal-line-direction line profile is calculated may be one or larger. In other words, it is possible to select, as appropriate, the portions at which the curvature M of the normal-line-direction line profile is to be calculated (i.e., which of the boundary pixels b(j), the curvature M of the normal-line-direction line profile is to be calculated for), so that the curvature M of the normal-line-direction line profile is calculated for each of the selected portions of the boundary. Further, in the present example, the edge strength E and the curvature M of the normal-line-direction line profile are calculated by using the R value $I_R(x,y)$ of the pixels within the intraluminal image I(x,y); however, the values calculated as the boundary feature data and the calculation method thereof are not limited to this example. In other words, the boundary feature data may be any other values and may be obtained by using any other calculating method, as long as the values correspond to the fluctuation of the pixel values at the boundary of the halation candidate region U(i).

After that, at step a11, based on the edge strength E and the curvature M of the normal-line-direction line profile calculated as the boundary feature data as a result of the boundary feature data calculating process at step a9, the boundary feature judging unit 18 judges whether the halation candidate region U(i) being the processing target is a halation region. More specifically, the boundary feature judging unit 18 determines that the halation candidate region U(i) being the processing target is a halation region, if the edge strength E calculated at step b5 in FIG. 5 is equal to or larger than a predetermined threshold, and also, the curvature M of the normal-line-direction line profile calculated at step b7 in FIG. 5 is equal to or larger than a predetermined threshold.

In the present example, the edge strength E and the curvature M of the normal-line-direction line profile at the boundary of the halation candidate region are calculated. Subsequently, by using the edge strength E and the curvature M of the normal-line-direction line profile that have been calculated as the boundary feature data, it is judged whether each of the halation candidate regions is a halation region; however, the judging method is not limited to this example. In other words, as long as it is possible to determine the halation regions based on the fluctuation of the pixel values being different at the boundary of each of the halation candidate regions, it is acceptable to judge whether each of the halation candidate regions is a halation region by using only the edge strength E as the boundary feature data. Alternatively, it is also acceptable to judge whether each of the halation candidate regions is a halation region by using only the curvature M of the normal-line-direction line profile as the boundary feature data. Further, it is also acceptable to judge whether each of the halation candidate regions is a halation region by using boundary feature data other than the edge strength E and the curvature M of the normal-line-direction line profile.

When the process of judging whether the halation candidate region U(i) being the processing target is a halation region is finished as described above, it is judged whether the index i is smaller than Max_i. If the index i is smaller than Max_i (step a13: Yes), the index i is incremented and updated (step a15), so that the process at steps a9 to a13 is performed on the next halation candidate region U(i). On the contrary, if the index i is not smaller than Max_i and all the halation candidate regions have been processed (step a13: No), the process is ended.

As explained above, in the first embodiment, first, the halation candidate regions are extracted from the intraluminal image, based on the color feature data, which is the first feature data. After that, the boundary feature data is calculated as the second feature data that is different from the color feature data, for each of the extracted halation candidate regions. More specifically, the edge strength and the curvature of the normal-line-direction line profile at the boundary of each of the halation candidate regions are calculated as the boundary feature data, based on the characteristic of the halation regions where the pixel values fluctuate significantly at the boundary, being different between the region inside the boundary and the region outside the boundary. Further, based on the boundary feature data, the halation regions are extracted by judging whether each of the halation candidate regions is a halation region. According to the first embodiment, it is possible to extract the halation regions while eliminating the regions that are not halation regions (e.g., a region having a white lesion and being in a color similar to the color of a halation region) from the halation candidate regions extracted as the white regions. Accordingly, an advantageous effect is achieved where it is possible to properly determine the halation regions, which are an example of the unnecessary regions, and to extract the halation regions with a high level of precision.

When the halation regions are extracted from the intraluminal image as described above, a process of extracting abnormal part regions such as a lesion region and/or a bleeding region or the like is applied to the intraluminal image, before the intraluminal image is displayed on the display unit 13 as appropriate and presented to the user who is a medical doctor or the like. More specifically, for example, the intraluminal image is displayed on the display unit 13 as an image in which the abnormal part regions are distinguishable from the other regions. Alternatively, the intraluminal image including the abnormal part regions is displayed on the display unit 13 as an image with which a diagnosis should be made. In this situation, by applying the first embodiment thereto, it is possible to specify a region that should be focused on ("focused region") while eliminating the extracted halation regions and to extract the abnormal part regions from the focused region. As a result, it is possible to realize the abnormal part detecting process with a high level of precision.

Second Embodiment

Figure 8:
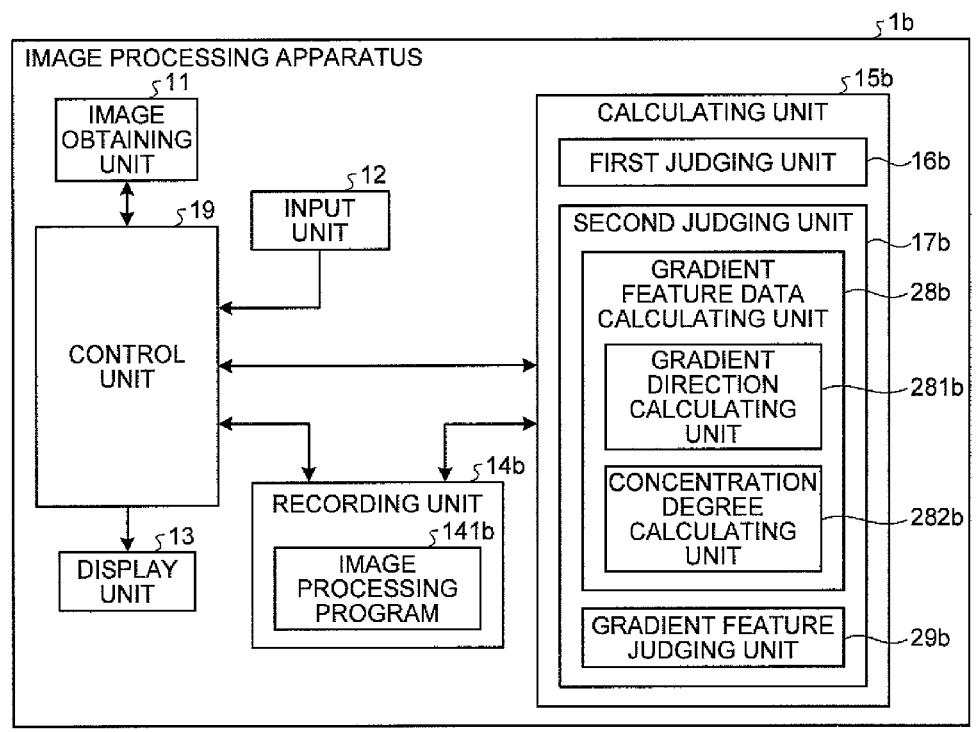
FIG. 8 is a block diagram explaining a functional configuration of an image processing apparatus according to a second embodiment of the present invention.

First, a configuration of an image processing apparatus according to a second embodiment of the present invention will be explained. FIG. 8 is a block diagram explaining a functional configuration of an image processing apparatus 1b according to the second embodiment. Some of the configurations that are the same as those explained in the first embodiment will be referred to by using the same reference symbols. As shown in FIG. 8, the image processing apparatus 1b according to the second embodiment includes: the image obtaining unit 11, the input unit 12, the display unit 13, a recording unit 14b, a calculating unit 15b, and the control unit 19 that controls an overall operation of the image processing apparatus 1b. The image processing apparatus 1b performs a process of extracting dark part regions as unnecessary regions, from an intraluminal image.

The recording unit 14b records therein an image processing program 141b for detecting the dark part regions from the intraluminal image.

The calculating unit 15b includes a first judging unit 16b and a second judging unit 17b. The first judging unit 16b determines a dark part candidate region, which is an example of the unnecessary candidate regions, on the basis of the color feature data, which is the first feature data based on the color information of the intraluminal image. The second judging unit 17b judges whether the dark part candidate region is a dark part region, based on the second feature data, which is different from the color feature data. The second judging unit 17b includes a gradient feature data calculating unit 28b and a gradient feature judging unit 29b. In this situation, the second feature data is a value calculated based on changes in the pixel values near the boundary of the dark part candidate region. For example, in the second embodiment, the gradient feature data calculating unit 28b calculates, as the second feature data, gradient feature data of a surrounding area (i.e., an outside area nearby) of the dark part candidate region. The gradient feature data calculating unit 28b includes a gradient direction calculating unit 281b and a concentration degree calculating unit 282b. The gradient direction calculating unit 281b calculates a gradient direction in the surrounding of the dark part candidate region. Further, based on the gradient direction in the surrounding of the dark part candidate region calculated by the gradient direction calculating unit 281b, the concentration degree calculating unit 282b calculates a concentration degree of the gradients as the gradient feature data. Based on the gradient feature data (i.e., the concentration degree of the gradients), the gradient feature judging unit 29b judges whether the dark part candidate region is a dark part region.

Figure 9:
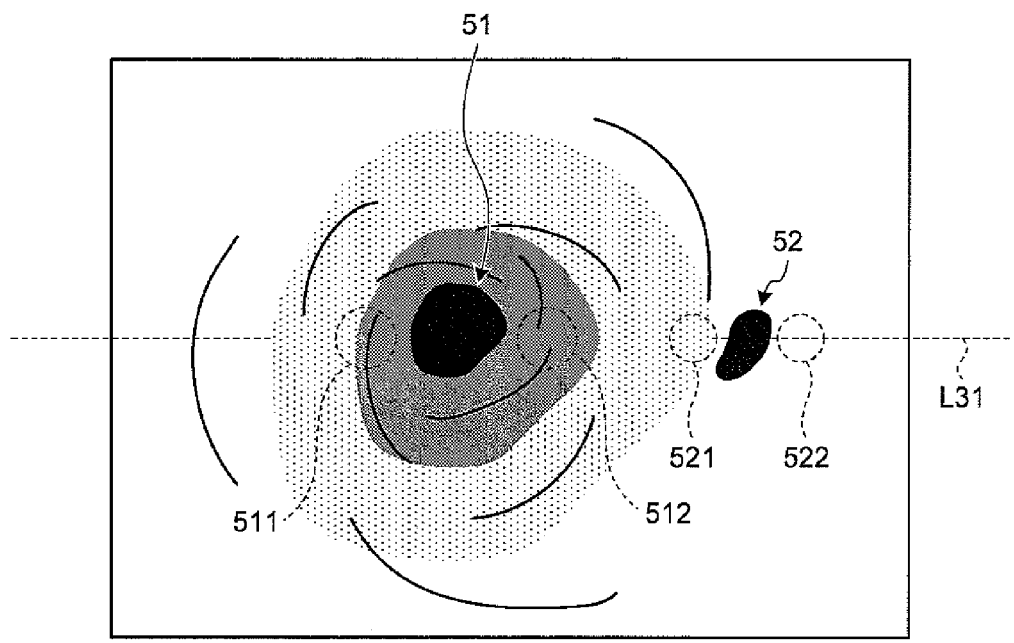
FIG. 9 is a schematic drawing of an example of an intraluminal image.
Figure 10:
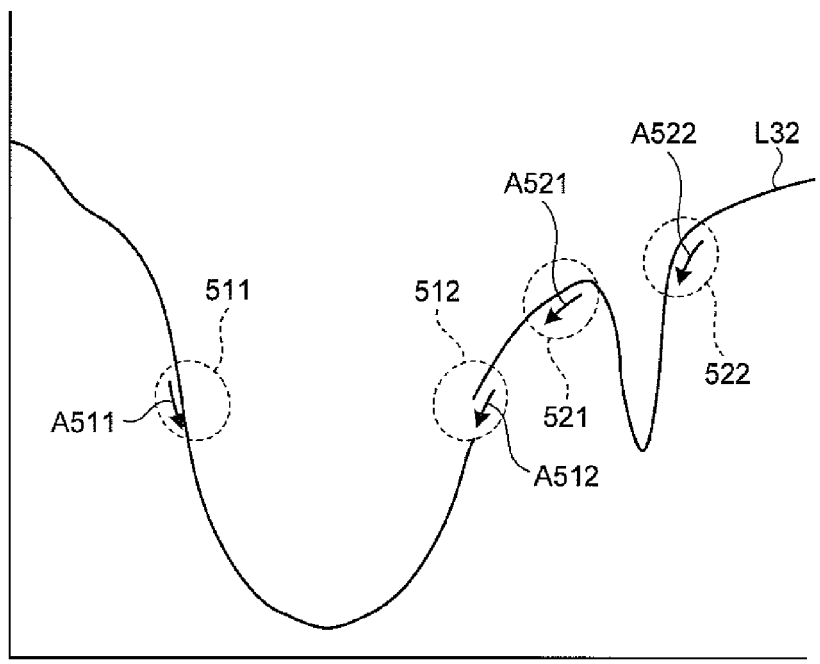
FIG. 10 is a chart explaining changes in pixel values inside an intraluminal image.

Next, a principle for extracting dark part regions in the second embodiment will be explained. FIG. 9 is a schematic drawing of an intraluminal image. FIG. 10 is a chart explaining changes in pixel values inside an intraluminal image and shows a change curve L32 of the pixel values on a line L31 indicated with a broken line in FIG. 9. In an intraluminal image taken while the medical observation apparatus is facing the far side of the lumen, the far side of the lumen is shown as a dark part region 51, as depicted in FIG. 9. The dark part region 51 appears as a black region in the intraluminal image. For this reason, first, black regions are extracted as the dark part candidate regions from the intraluminal image. For example, in the intraluminal image in FIG. 9, a dark part region 51 as well as a black region 52 that is different from the dark part region 51, both of which are extracted as dark part candidate regions, are shown.

As explained above, the dark part candidate regions are the black regions in the intraluminal image. In intraluminal images, however, in addition to such dark part regions, regions having coagulated blood or the like also appear as black regions that look similar to dark part regions. Unlike the dark part regions, those regions having coagulated blood or the like can serve as regions that should be focused on when making a medical observation/diagnosis. For example, in FIG. 9, let us assume that the black region 52, which is different from the dark part region 51, is a region having coagulated blood or the like.

In this situation, within the lumen, the dark part region is a region positioned distant from the image taking surface. For this reason, the dark part region has a characteristic where the changes in the pixel values in the surrounding thereof are sloped toward the dark part region. For example, as indicated by the change curve L32 of the pixel values in FIG. 10, in areas 511 and 512 in the surrounding of the dark part region 51 (i.e., the outside areas near the dark part region 51) in FIG. 9, the pixel values decrease in a direction toward the dark part region 51, as indicated by arrows A511 and A512 in FIG. 10. In the surrounding of the dark part region 51, the changes in the pixel values are sloped toward the dark part region 51 in the entire area. On the contrary, for the black region 52, which is a region having coagulated blood or the like, in an area 522 in the surrounding of the black region 52 (the outside area near the black region 52) positioned on the right-hand side of FIG. 9, for example, the pixel value decreases in a direction toward the black region 52, as indicated by an arrow A522 in FIG. 10. In contrast, in an area 521 on the left-hand side, the pixel value decreases in a direction away from the black region 52, as indicated by an arrow A521. In other words, in the area 521 to the left of the black region 52, the pixel value decreases toward the dark part region 51, which is positioned to the left of the black region 52. For this reason, in the second embodiment, by focusing on the changes in the pixel values in the surrounding of the dark part candidate regions obtained by extracting the black regions, and more specifically, by focusing on the directions in which the changes in the pixel values are sloped, it is judged whether each of the dark part candidate regions is a dark part region so that the dark part regions can be extracted.

Next, a specific processing procedure performed by the image processing apparatus 1b according to the second embodiment will be explained, with reference to FIG. 11. The process explained below is realized when the calculating unit 15b executes the image processing program 141b stored in the recording unit 14b.

Figure 11:
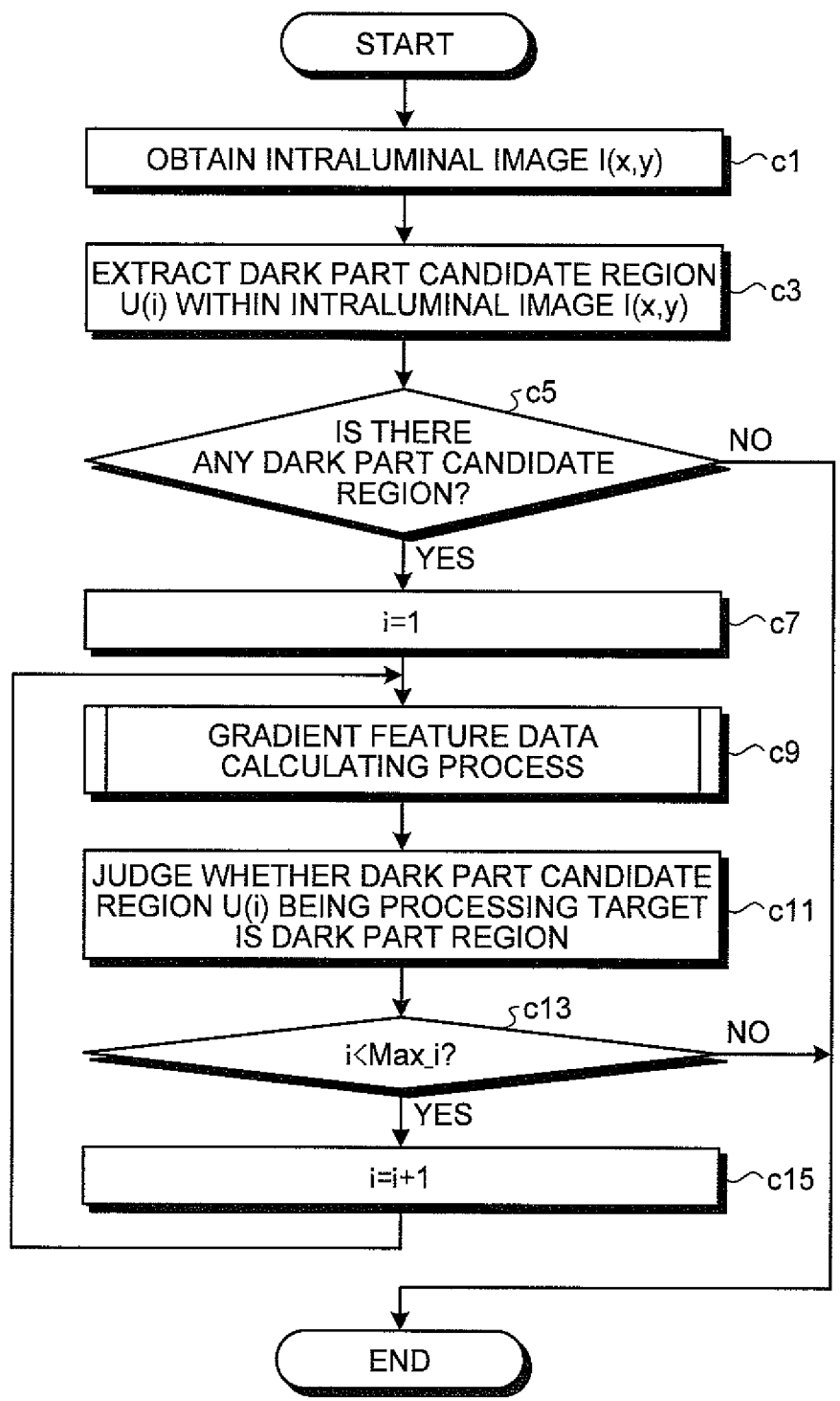
FIG. 11 is an overall flowchart of a processing procedure performed by the image processing apparatus according to the second embodiment.

As shown in FIG. 11, the calculating unit 15b first obtains an intraluminal image I(x,y) being a processing target (step c1). The characters "x" and "y" denote coordinates of pixel positions in the intraluminal image. Subsequently, the first judging unit 16b extracts a dark part candidate region U(i) within the intraluminal image I(x,y), based on the color feature data of the intraluminal image I(x,y) obtained at step c1 (step c3). As explained above, dark part regions appear as black regions in intraluminal images. For this reason, in the second embodiment, the color information (the R value, the G value, and the B value) of the intraluminal image is used as the color feature data so as to identify the pixels belonging to the black regions. After that, the dark part candidate region U(i) is extracted by performing a publicly-known labeling process on the pixels identified as belonging to the black regions.

Next, a more specific processing procedure will be explained. For each of the pixels in the intraluminal image I(x,y), the R value, the G value, and the B value are each compared with a predetermined threshold, so as to judge whether all of the R, G, and B values are equal to or smaller than the threshold. Subsequently, any pixel of which all of the R, G, and B values are judged to be equal to or smaller than the threshold is considered as a pixel belonging to a black region, and a temporary pixel value "0" is assigned thereto. On the contrary, to any pixel of which at least one of the R, G, and B values is judged to be larger than the threshold, a temporary pixel value "1" is assigned.

After that, the dark part candidate regions are extracted by performing the labeling process based on the temporary pixel values assigned to the pixels in the intraluminal image I(x,y) in the manner described above. The labeling process is performed in the same manner as in the first embodiment. The pixels having the temporary pixel value "0" are sectioned according to the connecting components thereof, so that the obtained pixel groups are determined as the dark part candidate regions. In this situation, as the index i used for identifying the dark part regions, the first judging unit 16b assigns serial numbers (where 1≤i≤Max_i) to the dark part regions, so as to obtain the dark part candidate region U(i).

In the present example, the dark part candidate regions are extracted by using the color information (the R value, the G value, and the B value) of each of the pixels as the color feature data; however, as long as it is possible to extract the black regions, the method is not limited to this example. As another example, it is acceptable to map the R value, the G value, and the B value of each of the pixels onto an HSI color space so as to compare the I value (the luminance value) with a predetermined threshold. In that situation, the dark part candidate regions are extracted by identifying any pixel of which the I value is judged to be equal to or smaller than the threshold as a pixel belonging to a black region and subsequently performing the labeling process in the same manner.

After that, the first judging unit 16b judges whether there is any dark part candidate region in the intraluminal image I(x,y). If no dark part candidate region is extracted as a result of the process at step c3, the first judging unit 16b determines that there is no dark part candidate region (step c5: No), and this process is ended. On the contrary, if one or more dark part candidate regions are extracted as a result of the process at step c3, the first judging unit 16b determines that there are one or more dark part candidate regions (step c5: Yes), and the process proceeds to step c7.

Further, at step c7, the index i of the dark part candidate region being the processing target is set to "1". After that, the gradient feature data calculating unit 28b performs the gradient feature data calculating process to calculate the gradient feature data of the dark part candidate region U(i) being the processing target (step c9).

In the second embodiment, as explained above, based on the characteristic of the dark part regions where the changes in the pixel values in the surrounding thereof are sloped toward the dark part region, the gradient feature data is calculated as a criterion used for judging whether the dark part candidate region U(i) is a dark part region. Further, based on the gradient feature data, the dark part regions and the regions having coagulated blood or the like, both of which appear as black regions and are in similar colors, are distinguished from each other.

Figure 12:
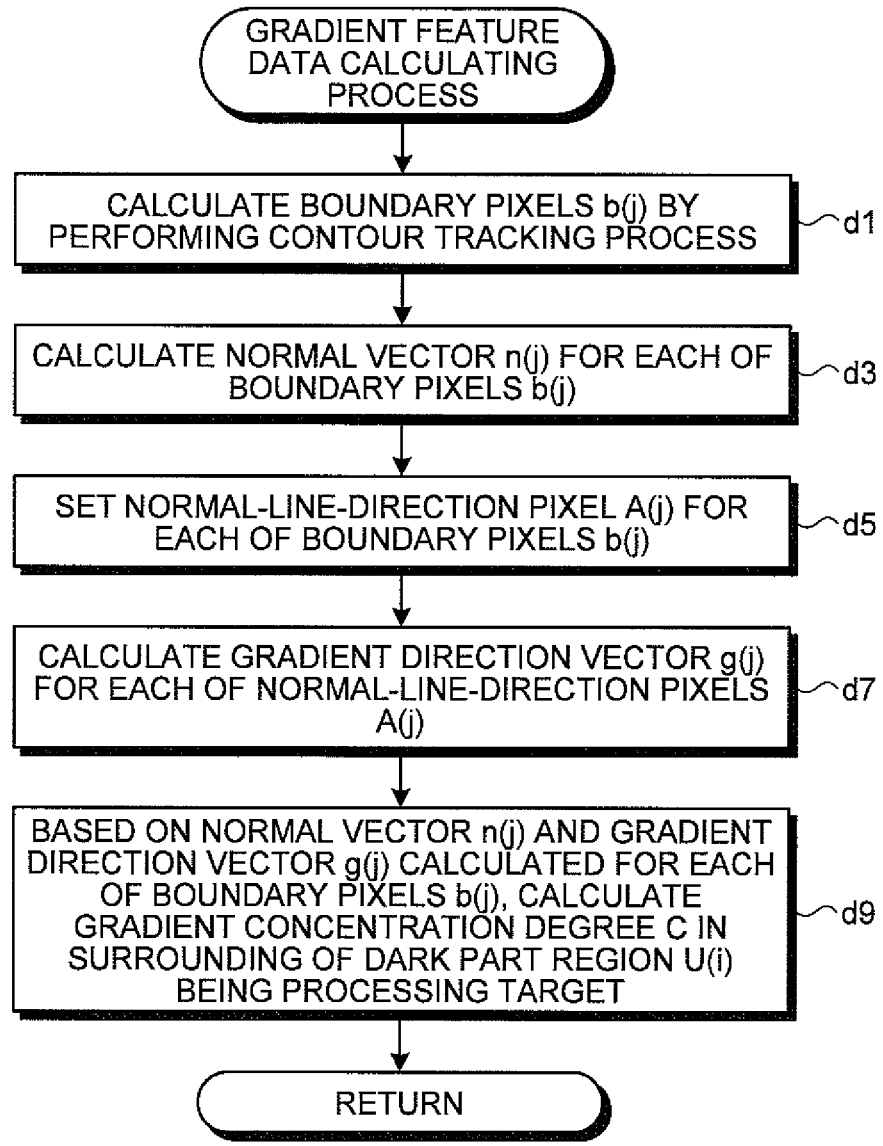
FIG. 12 is a flowchart of a detailed processing procedure of a gradient feature data calculating process.

FIG. 12 is a flowchart of a detailed processing procedure of the gradient feature data calculating process. As shown in FIG. 12, during the gradient feature data calculating process, the gradient feature data calculating unit 28b first performs the same process as at step b1 in FIG. 5 to detect the boundary pixels b(j) in the dark part candidate region U(i) being the processing target (step d1). After that, the gradient feature data calculating unit 28b performs the same process as at step b3 in FIG. 5 to calculate, for each of the boundary pixels b(j), a normal vector n(j) with respect to the boundary of the dark part candidate region U(i) being the processing target (step d3).

Subsequently, based on the normal vector n(j) calculated for each of the boundary pixels b(j) at step d3, the gradient feature data calculating unit 28b sets a pixel A(j) positioned in the normal line direction (hereinafter, a "normal-line-direction pixel") of each of the boundary pixels b(j) (step d5). As explained in the first embodiment, the normal vector n(j) calculated at step d3 is obtained as being oriented toward the outside of the dark part candidate region U(i) being the processing target. In the present example, a pixel positioned at a predetermined distance in the direction of the normal vector n(j) (i.e., toward the outside of the dark part candidate region U(i) being the processing target) is set as the normal-line-direction pixel A(j).

In actuality, at step d5, the gradient feature data calculating unit 28b sets the normal-line-direction pixel A(j) according to Expressions (9) and (10) below. In Expressions (9) and (10), $A_x(j)$ denotes an x coordinate of the normal-line-direction pixel A(j), whereas $A_y(j)$ denotes a y coordinate of the normal-line-direction pixel A(j). Further, $k_2$ is an arbitrary constant. Also, $A_x(j)$ and $A_y(j)$ are each an integer. When $A_x(j)$ and $A_y(j)$ are calculated, each value is rounded to the nearest integer.

$$A_x(j)=b_x(j)+k_2 \cdot n_x(j) \quad (9)$$

$$A_y(j)=b_y(j)+k_2 \cdot n_y(j) \quad (10)$$

After that, the gradient direction calculating unit 281b calculates a gradient direction vector g(j) for each of the normal-line-direction pixels A(j) respectively set for the boundary pixels b(j) at step d5 (step d7). In this situation, the gradient direction vector g(j) is a vector having a base point at the normal-line-direction pixel A(j) and indicating the direction of the pixel that has the smallest pixel value in the surrounding of the normal-line-direction pixel A(j).

More specifically, the gradient direction calculating unit 281b first calculates a difference value d(x,y) by using Expression (11) below, for each of the pixels in a 3×3 pixel range centered around the normal-line-direction pixel A(j). In Expression (11), x and y are the coordinates of each of the pixels in the 3×3 pixel range centered around the normal-line-direction pixel A(j). Note that $A_x(j) \neq x$ and $A_y(j) \neq y$ are true.

$$d(x, y) = \frac{I_R(A_x(j), A_y(j)) - I_R(x, y)}{\sqrt{(A_x(j) - x)^2 + (A_y(j) - y)^2}} \quad (11)$$

After that, from among the pixels in the 3×3 pixel range centered around the normal-line-direction pixel A(j), a pixel of which the difference d(x,y) is the largest is selected.

Subsequently, by using expressions (12) and (13) below, the gradient direction vector g(j) is obtained by calculating the difference between the coordinates ($mx_j$, $my_j$) of the pixel selected as having the largest difference d(x,y) and the coordinates of the normal-line-direction pixel A(j). As a result, the gradient direction in the surrounding of the normal-line-direction pixel A(j) is obtained. In Expressions (12) and (13), "$g_x j$" denotes an x component of the gradient direction vector g(j), whereas "$g_y j$" denotes a y component of the gradient direction vector g(j). This process is performed for each of the normal-line-direction pixels A(j), so that the gradient direction vector g(j) is calculated for each of the normal-line-direction pixels A(j).

$$g_x(j)=mx_j-A_x(j) \quad (12)$$

$$g_y(j)=my_j-A_y(j) \quad (13)$$

In the present example, the gradient direction in the surrounding of the normal-line-direction pixel A(j) is obtained by calculating the gradient direction vector g(j) discretized in the eight directions; however, the calculating method is not limited to this example, as long as it is possible to obtain the gradient direction in the surrounding of the normal-line-direction pixel A(j). For example, it is also acceptable to obtain a gradient direction in the surrounding of the normal-line-direction pixel A(j) by calculating a continuous gradient direction vector g(j) according to Expressions (14) and (15) below. In Expressions (14) and (15), $\Delta_x f(A_x(j),A_y(j))$ denotes a result of applying a Sobel filter to the normal-line-direction pixel A(j) along the x direction, whereas $\Delta_y f(A_x(j),A_y(j))$ denotes a result of applying a Sobel filter along the y direction. By using this method in the present modification example where the continuous gradient direction vector g(j) is calculated by applying the Sobel filter, it is possible to calculate the gradient direction vector g(j) with a higher level of precision than in the example where the gradient direction vector g(j) discretized in the eight directions is calculated.

$$g_x(j)=\Delta_x f(A_x(j),A_y(j)) \tag{14}$$

$$g_y(j)=\Delta_y f(A_x(j),A_y(j)) \tag{14}$$

Further, the concentration degree calculating unit 282b calculates a concentration degree of the gradients (hereinafter, "gradient concentration degree") in the surrounding of the dark part candidate region U(i) being the processing target, based on the normal vector n(j) and the gradient direction vector g(j) calculated for each of the boundary pixels b(j) (step d9). The gradient concentration degree is a value that indicates a degree with which the gradient direction vector g(j) is oriented toward the dark part candidate region U(i). As described above, in the surrounding of a dark part region, the characteristic is observed where the changes in the pixel values are sloped toward the dark part region in the entire area (i.e., the pixel values become smaller toward the dark part region). It means that, if the dark part candidate region U(i) being the processing target is a dark part region, the gradient direction vector g(j) calculated for each of the boundary pixels b(j) is, in the entire area, in the opposite direction to the normal vector n(j) of the corresponding boundary pixel b(j). For this reason, in the present example, the gradient concentration degree is calculated by calculating an inner product of the normal vector n(j) and the gradient direction vector g(j), for each of the boundary pixels b(j).

In actuality, at step d9, the concentration degree calculating unit 282b calculates a gradient concentration degree C. according to Expression (16) below.

$$C = -\frac{1}{Nb}\sum_{j=1}^{Nb} \frac{n(j)\cdot g(j)}{|n(j)|\cdot |g(j)|} \tag{16}$$

By using Expression (16), the gradient concentration degree C. is calculated as a value obtained by multiplying an average of inner products of the normal vector n(j) and the gradient direction vector g(j) for all the boundary pixels b(j), with a negative sign. Accordingly, the gradient concentration degree (C) has the largest value when the gradient direction vectors g(j) of all the boundary pixels b(j) are in the exactly opposite direction to the respective corresponding normal vectors n(j), i.e., when the gradient direction vectors g(j) of all the boundary pixels b(j) are completely oriented toward the dark part candidate region U(i) being the processing target.

When the gradient concentration degree C. is calculated, the process returns to step c9 in FIG. 11, before proceeding to step c11. As a result of the gradient feature data calculating process, the gradient concentration degree C. in the surrounding of the dark part candidate region U(i) being the processing target is obtained, as the gradient feature data of the dark part candidate region U(i) being the processing target. In the present example, the concentration degree C. is obtained by calculating the inner product of the normal vector n(j) calculated with respect to the boundary pixel b(j) of the dark part candidate region U(i) and the gradient direction vector g(j) calculated with respect to the normal-line-direction pixel A(j) of the boundary pixel b(j); however, the calculating method is not limited to this example. In other words, as long as it is possible to calculate a gradient concentration degree in the surrounding of the dark part candidate region U(i), a value obtained by any other calculating method may be used.

Further, at step c11 in FIG. 11, the gradient feature judging unit 29b judges whether the dark part candidate region U(i) being the processing target is a dark part region, based on the gradient concentration degree C. calculated as the gradient feature data, as a result of the gradient feature data calculating process at step c9. More specifically, the gradient feature judging unit 29b determines that the dark part candidate region U(i) being the processing target is a dark part region, if the gradient concentration degree C. is equal to or larger than a predetermined threshold.

When the process of judging whether the dark part candidate region U(i) being the processing target is a dark part region is finished as described above, it is judged whether the index i is smaller than Max_i. If the index i is smaller than Max_i (step c13: Yes), the index i is incremented and updated (step c15), so that the process at steps c9 to c13 is performed on the next dark part candidate region U(i). On the contrary, if the index i is not smaller than Max_i and all the dark part candidate regions have been processed (step c13: No), the process is ended.

As explained above, in the second embodiment, first, the dark part candidate regions are extracted from the intraluminal image, based on the color feature data, which is the first feature data. After that, the gradient feature data is calculated as the second feature data that is different from the color feature data, for each of the extracted dark part candidate regions. More specifically, the gradient concentration degree is calculated as the gradient feature data, based on the characteristic of the dark part region where the changes in the pixel values are sloped toward the dark part region in the surrounding thereof (i.e., the pixel values become smaller toward the dark part region). Further, based on the gradient feature data, it is judged whether each of the dark part candidate regions is a dark part region, so that the dark part regions can be extracted. According to the second embodiment, it is possible to extract the dark part regions while eliminating the regions that are not dark part regions (e.g., a region having coagulated blood or the like and being in a color similar to the color of a dark part region) from the dark part candidate regions extracted as the black regions. As a result, an advantageous effect is achieved where it is possible to properly determine the dark part regions, which are an example of the unnecessary regions, and to extract the dark part regions with a high level of precision.

When the dark part regions are extracted from the intraluminal image as described above, the process of extracting the abnormal part regions is applied to the intraluminal image in the same manner as explained in the first embodiment, before the intraluminal image is displayed on the display unit 13 as appropriate and presented to the user who is a medical doctor or the like. In this situation, by applying the second embodiment thereto, it is possible to specify a region that should be focused on ("focused region") while eliminating the extracted dark part regions and to extract the abnormal part regions from the focused region. As a result, it is possible to realize the abnormal part detecting process with a high level of precision.

Third Embodiment

Figure 13:
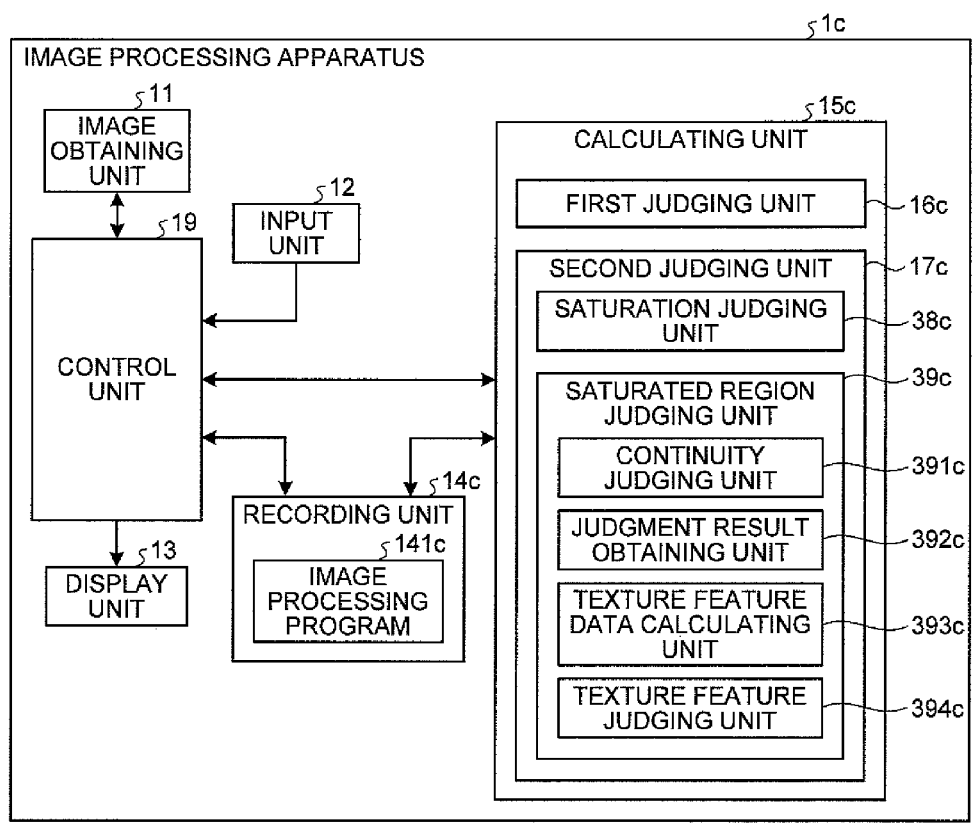
FIG. 13 is a block diagram explaining a functional configuration of an image processing apparatus according to a third embodiment of the present invention.

Next, a third embodiment of the present invention will be explained. FIG. 13 is a block diagram explaining a functional configuration of an image processing apparatus 1c according to the third embodiment. Some of the configurations that are the same as those explained in the first embodiment will be referred to by using the same reference symbols. As shown in FIG. 13, the image processing apparatus 1c according to the third embodiment includes: the image obtaining unit 11, the input unit 12, the display unit 13, a recording unit 14c, a calculating unit 15c, and the control unit 19 that controls an overall operation of the image processing apparatus 1c. The image processing apparatus 1c performs a process of extracting contents regions as unnecessary regions, from an intraluminal image.

The recording unit 14c records therein an image processing program 141c for detecting the contents regions from the intraluminal image.

The calculating unit 15b includes a first judging unit 16c and a second judging unit 17c. The first judging unit 16c determines a contents candidate region, which is an example of the unnecessary candidate regions, on the basis of the color feature data, which is the first feature data based on the color information of the intraluminal image. The second judging unit 17c judges whether the contents candidate region is a contents region, based on the second feature data, which is different from the color feature data. The second judging unit 17c includes a saturation judging unit 38c and a saturated region judging unit 39c. The saturation judging unit 38c judges whether the contents candidate region is a saturated region or an unsaturated region, by using the pixel values of the pixels belonging to the contents candidate region. The saturated region judging unit 39c is a functional unit that judges whether the contents candidate region judged to be a saturated region is a contents region and includes: a continuity judging unit 391c, a judgment result obtaining unit 392c, a texture feature data calculating unit 393c, and a texture feature judging unit 394c. The continuity judging unit 391c judges continuity between the contents candidate region judged to be a saturated region and a region positioned adjacent thereto (hereinafter, "adjacent region"), by using the continuity with the adjacent region as the second feature data. The judgment result obtaining unit 392c obtains a result of the judgment made by the continuity judging unit 391c. The texture feature data calculating unit 393c calculates texture feature data of the contents candidate region judged to be a saturated region, as the second feature data. The texture feature judging unit 394c judges whether the region is an unnecessary region based on the texture feature data.

Figure 14:
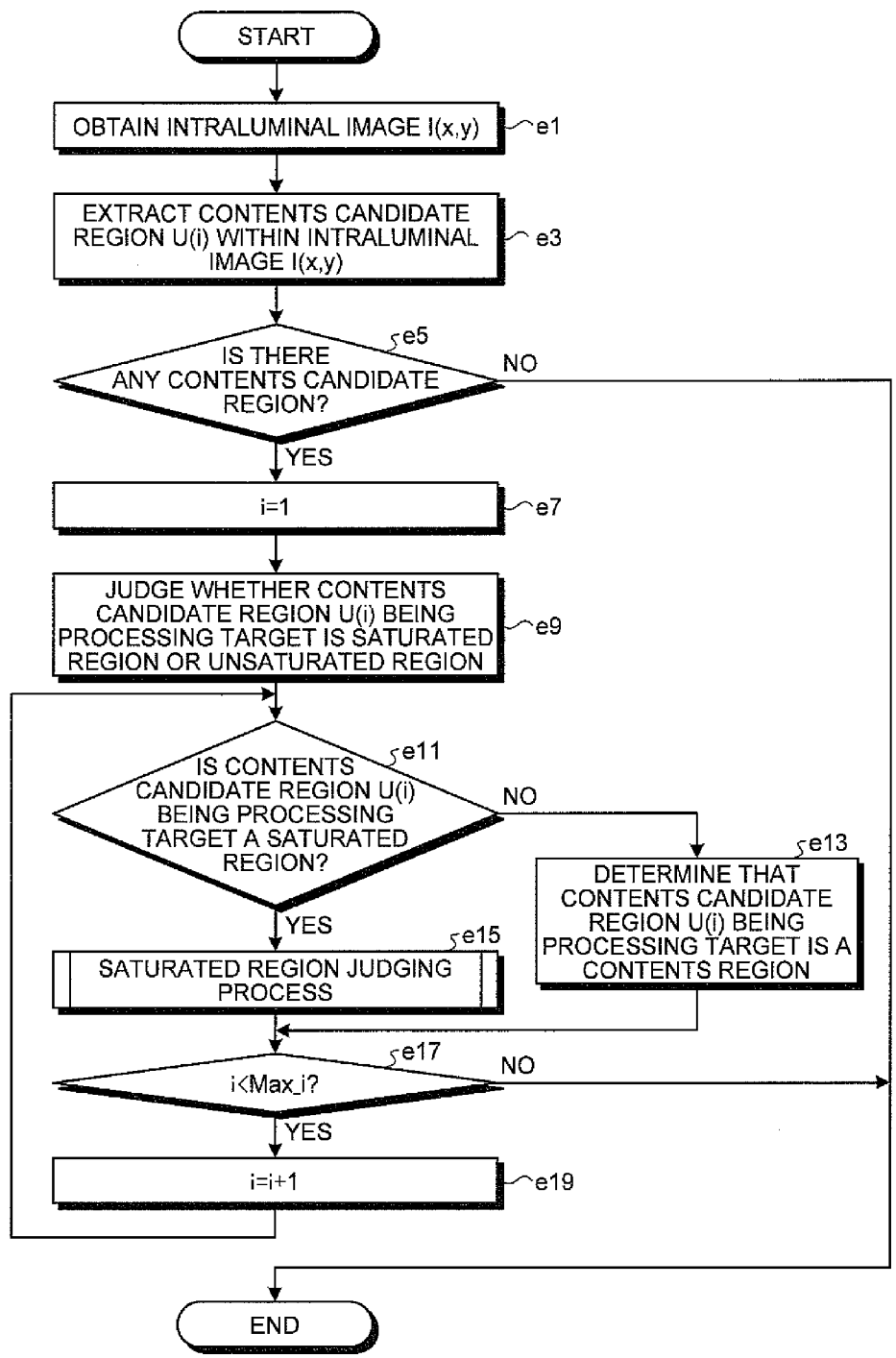
FIG. 14 is an overall flowchart of a processing procedure performed by the image processing apparatus according to the third embodiment.

FIG. 14 is an overall flowchart of a processing procedure performed by the image processing apparatus 1c according to the third embodiment. The process explained below is realized when the calculating unit 15c executes the image processing program 141c recorded in the recording unit 14c.

As shown in FIG. 14, the calculating unit 15c first obtains an intraluminal image I(x,y) being a processing target (step e1). The characters "x" and "y" denote coordinates of pixel positions in the intraluminal image. Subsequently, the first judging unit 16c extracts a contents candidate region U(i) within the intraluminal image I(x,y), based on the color feature data of the intraluminal image I(x,y) obtained at step e1 (step e3). In this situation, contents regions appear as yellow regions in intraluminal images. For this reason, in the third embodiment, the color information (the R value, the G value, and the B value) of the intraluminal image is used as the color feature data so as to identify the pixels belonging to the yellow regions. After that, the contents candidate region U(i) is extracted by performing a publicly-known labeling process on the pixels identified as belonging to the yellow regions.

Next, a more specific processing procedure will be explained. For each of the pixels in the intraluminal image I(x,y), a G/R value and a B/G value are calculated from the R value, the G value, and the B value. Subsequently, the G/R value and the B/G value calculated are mapped onto a G/R-B/G feature space. After that, if the coordinates of a mapped feature point is within a predetermined range, the corresponding pixel is considered as a pixel belonging to a yellow region so that a temporary pixel value "0" is assigned thereto. On the contrary, if the coordinates of a mapped feature point is outside the predetermined range, a temporary pixel value "1" is assigned to the corresponding pixel.

After that, the contents candidate regions are extracted by performing the labeling process based on the temporary pixel values assigned to the pixels in the intraluminal image I(x,y) in the manner described above. The labeling process is performed in the same manner as in the first embodiment. The pixels having the temporary pixel value "0" are sectioned according to the connecting components thereof, so that the obtained pixel groups are determined as the contents candidate regions. In this situation, as the index i used for identifying the contents regions, the first judging unit 16c assigns serial numbers (where 1≤i≤Max_i) to the contents regions, so as to obtain the contents candidate region U(i).

In the present example, the contents candidate regions are extracted by using the G/R value and the B/G value calculated from the color information (the R value, the G value, and the B value) of each of the pixels, as the color feature data; however, as long as it is possible to extract the yellow regions, the method is not limited to this example. As another example, it is acceptable to map the R value, the G value, and the B value of each of the pixels onto an HSI color space so as to judge whether the H value (the hue value) is included in a predetermined range. In that situation, the dark part candidate regions are extracted by identifying any pixel included in the predetermined range as a pixel belonging to a yellow region and subsequently performing the labeling process in the same manner.

After that, the first judging unit 16c judges whether there is any contents candidate region in the intraluminal image I(x, y). If no contents candidate region is extracted as a result of the process at step e3, the first judging unit 16c determines that there is no contents candidate region (step e5: No), and this process is ended. On the contrary, if one or more contents candidate regions are extracted as a result of the process at step e3, the first judging unit 16c determines that there are one or more contents candidate regions (step e5: Yes), and the process proceeds to step e7.

Further, at step e7, the index i of the contents candidate region being the processing target is set to "1". After that, the saturation judging unit 38c first judges whether the contents candidate region U(i) being the processing target is a saturated region or an unsaturated region, based on the R value of a pixel belonging to the contents candidate region U(i) being the processing target (step e9).

In intraluminal images capturing images inside a lumen in the body of a subject, when the R value, the G value, and the B vale are compared with one another, the R value is usually the largest. For this reason, when the inside of a lumen becomes brighter due to an adjustment made to the lighting or the like, the R value becomes saturated first. In other words, the R value stops changing when the brightness reaches a certain level. When the R value becomes saturated in this manner, the balance between the R, G, and B values is lost, so that the image tends to look more yellow than the original color. Unlike the contents regions, those regions showing yellow mucous membranes that look yellow can serve as regions that should be focused on when making a medical observation/diagnosis. For this reason, at step e9, it is first judged whether the contents candidate region U(i) being the processing target is a region in which the R value is saturated or a region in which the R value is unsaturated.

More specifically, the saturation judging unit 38c judges whether the R value is saturated or not by calculating an average of the R values of the pixels in the contents candidate region U(i) being the processing target and comparing the calculated average of the R values with a predetermined threshold. If the R value is saturated, i.e., if the average of the R values is equal to or larger than the threshold, the saturation judging unit 38c determines that the contents candidate region U(i) being the processing target is a saturated region. On the contrary, if the R value is not saturated, i.e., if the average of the R values is smaller than the threshold, the saturation judging unit 38c determines that the contents candidate region U(i) being the processing target is an unsaturated region.

In the present example, it is judged whether the contents candidate region U(i) is a saturated region or an unsaturated region by using the average of the R values of the contents candidate region U(i); however, the method is not particularly limited, as long as it is possible to judge the saturation.

Further, if the contents candidate region U(i) being the processing target is judged to be an unsaturated region and not a saturated region, as a result of the process at step e9 (step e11: No), it is determined that the contents candidate region U(i) being the processing target is a contents region (step e13), and the process subsequently proceeds to step e11 explained later. The reason can be explained as follows: If the R value is not saturated, the region looks yellow not because it got brighter from an adjustment made to the lighting or the like. Thus, the contents candidate region is judged to be a contents region.

On the contrary, if the contents candidate region U(i) being the processing target is judged to be a saturated region at step e9 (step e11: Yes), the saturated region judging unit 39c subsequently performs a saturated region judging process to judge whether the contents candidate region U(i) being the processing target and having been judged to be a saturated region is a contents region (step e15).

Figure 15:
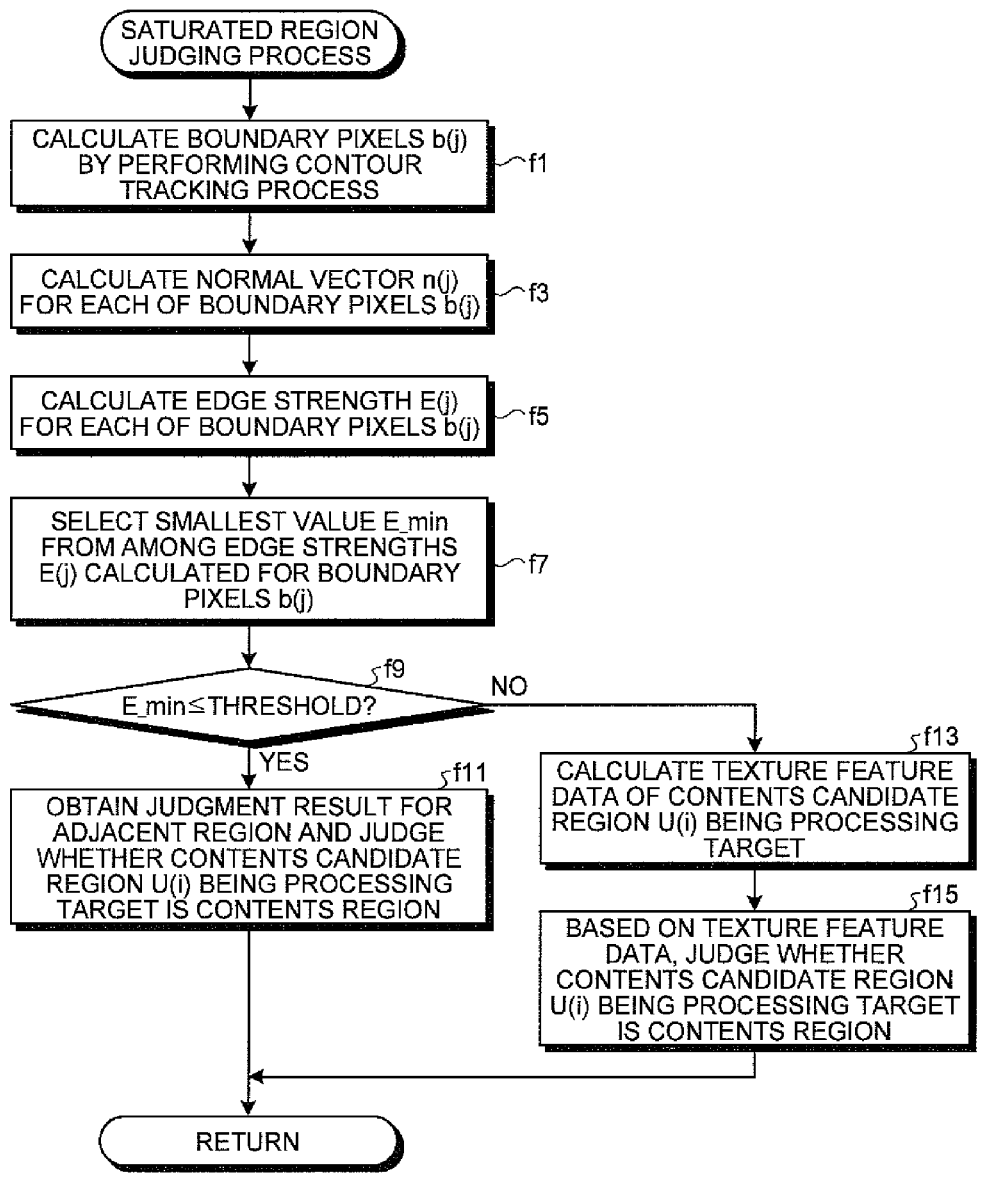
FIG. 15 is a flowchart of a detailed processing procedure of a saturated region judging process.

FIG. 15 is a flowchart of a detailed processing procedure of the saturated region judging process. As shown in FIG. 15, during the saturated region judging process, the saturated region judging unit 39c first performs the same process as at step b1 in FIG. 5 and detects the boundary pixels b(j) in the contents candidate region U(i) being the processing target (step f1). Further, by performing the same process as at step b3 in FIG. 5, the saturated region judging unit 39c calculates, for each of the boundary pixels b(j), the normal vector n(j) with respect to the boundary of the contents candidate region U(i) being the processing target (step f3).

Subsequently, the continuity judging unit 391c judges whether there is continuity with the adjacent region, which is an example of the second feature data. The "continuity with the adjacent region" refers to continuity between the contents candidate region U(i) being the processing target and a region positioned adjacent to the contents candidate region U(i) being the processing target (i.e., the region positioned adjacent to the contents candidate region U(i) being the processing target while the boundary is interposed therebetween; hereinafter, "adjacent region"). More specifically, the continuity judging unit 391c first calculates an edge strength E(j) for each of the boundary pixels b(j) by using Expressions (17) to (21) below (step f5). In Expressions (17) to (21), $I_G(x,y)$ denotes the G value of the pixel at each of the pixel positions expressed by the coordinates $(x_1,y_1)$ and $(x_2,y_2)$ within the intraluminal image I(x,y). Although the G value is used in the present example, the value may be any value other than the R value, which is saturated. It is acceptable to use the B value instead. Further, $k_3$ is an arbitrary constant. Also, $x_1$, $x_2$, $y_1$, and $y_2$ are each an integer. When $x_1$, $x_2$, $y_1$, and $y_2$ are calculated, each value is rounded to the nearest integer.

$$E(j)=I_G(x_1,y_1)-I_G(x_2,y_2) \quad (17)$$

$$\text{where } x_1=b_x(j)+k_3 \cdot n_x(j) \quad (18)$$

$$y_1=b_y(j)+k_3 \cdot n_y(j) \quad (19)$$

$$x_2=b_x(j)-k_3 \cdot n_x(j) \quad (20)$$

$$y_2=b_y(j)-k_3 \cdot n_y(j) \quad (21)$$

After that, the continuity judging unit 391c selects the smallest value E_min from among the edge strengths E(j) respectively calculated for the boundary pixels b(j) (step f7). If the selected smallest value E_min among the edge strengths E(j) is equal to or smaller than a predetermined threshold (step f9: Yes), the continuity judging unit 391c determines that there is continuity between the contents candidate region U(i) being the processing target and the adjacent region, so that the process proceeds to step f11. On the contrary, if the selected smallest value E_min is larger than the threshold (step f9: No), the continuity judging unit 391c determines that there is no continuity between the contents candidate region U(i) being the processing target and the adjacent region, so that the process proceeds to step f13.

In the present example, the edge strength E(j) is calculated for each of the boundary pixels b(j), so that the continuity with the adjacent region is judged based on the smallest value E_min among the edge strengths E(j); however, the method is not particularly limited, as long as it is possible to judge continuity between the contents candidate region U(i) being the processing target and the adjacent region.

After that, at step f11 to which the process proceeds when the smallest value E_min among the edge strengths E(j) is equal to or smaller than the threshold, the judgment result obtaining unit 392c judges whether the contents candidate region U(i) being the processing target is a contents region, by obtaining the result of the judgment as to whether the adjacent region is a contents region. After that, the process returns to step e15 in FIG. 14 before proceeding to step e17. In other words, if there is continuity between the contents candidate region U(i) being the processing target and the adjacent region, it is determined that the contents candidate region U(i) being the processing target is the same type of region as the adjacent region. In the present example, at step e3 in FIG. 14, the first judging unit 16c determines that the yellow regions are each the contents candidate region U(i) and that the other regions are not regions having contents. Accordingly, it has been determined that the adjacent region of the contents candidate region U(i) being the processing target is not a region other than contents. The result of this judgment is obtained at step f11, so that it is determined that the contents candidate region U(i) being the processing target is not a contents region. In that situation, it is determined that the candidate region U(i) being the processing target is a region having a yellow mucous membrane or the like that looks more yellow than the surrounding region thereof because it got brighter from an adjustment made to the lighting or the like.

In contrast, at step f13 to which the process proceeds when the smallest value E_min among the edge strengths E(j) is larger than the threshold, the texture feature data calculating unit 393c calculates the texture feature data of the contents candidate region U(i) being the processing target as a second example of the second feature data. In this situation, with regard to a region having a yellow mucous membrane or the like and being in a color similar to the color of a contents region, it is determined that the region has no continuity with the adjacent region thereof when, for example, folds on the internal wall of the small intestine are shown in yellow in the image. Such a site with folds can be considered as a pattern with regularity. In contrast, contents regions have no regularity in the patterns thereof. For this reason, a focus is placed on the fact that the patterns of contents regions have no regularity, whereas some of the regions having a yellow mucous membrane or the like and being in a color similar to the color of contents regions have regularity in the patterns thereof (e.g., when folds are shown in yellow in the image).

In other words, at step f13, the texture feature data mentioned above is calculated as a criterion used for judging whether the contents candidate region is a contents region. The texture feature data is, for example, a value quantifying repetitive patterns, directionality, and contrast of the pixel values in the region. Based on the texture feature data, the contents regions and the regions having a yellow mucous membrane or the like, both of which appear as yellow regions and are in similar colors, are distinguished from each other.

More specifically, an entropy value calculated by using, for example, a co-occurrence matrix is used as the texture feature data (see CG-ARTS Society, Digital Gazou Shori [digital image processing], page 195). Because the entropy value is a value indicating randomness of the pixel values in the region, if the contents candidate region U(i) being the processing target is a contents region, the calculated entropy value is large.

After that, the texture feature judging unit 394c judges whether the contents candidate region U(i) being the processing target is a contents region, based on the texture feature data calculated at step f13 (step f15). More specifically, if the texture feature data is equal to or larger than a predetermined threshold, the texture feature judging unit 394c determines that the contents candidate region U(i) being the processing target is a contents region. After that, the process returns to step e15 in FIG. 14, before proceeding to step e17.

In the present example, the entropy value is calculated as the texture feature data; however, the method is not particularly limited as long as it is possible to judge whether an unsaturated region is a contents region or a region other than a contents region. For example, it is acceptable to calculate a dispersion value of the pixel values belonging to the contents candidate region U(i) being the processing target, so as to judge whether the contents candidate region U(i) being the processing target is a contents region, based on the obtained dispersion value.

After that, at step e17, it is judged whether the index i is smaller than Max_i. If the index i is smaller than Max_i (step e17: Yes), the index i is incremented and updated (step e19), so that the process at steps e11 to e17 is performed on the next dark part candidate region U(i). On the contrary, if the index i is not smaller than Max_i and all the dark part candidate regions have been processed (step e17: No), the process is ended.

As explained above, in the third embodiment, the contents candidate regions are extracted from the intraluminal image, based on the color feature data, which is the first feature data. After that, it is judged whether each of the extracted contents candidate regions is a saturated region or an unsaturated region. With respect to each of the contents candidate regions judged to be a saturated region, the second feature data, which is different from the color feature data, is calculated. More specifically, continuity with the adjacent region is used as a first example of the second feature data, so as to judge whether each of the contents candidate regions judged to be a saturated region has continuity with the adjacent region thereof. As a second example of the second feature data, the texture feature data is calculated. Further, based on the judgment result as to whether the contents candidate region is a saturated region or an unsaturated region, or based on the second feature data such as continuity with the adjacent region and the texture feature data, it is judged whether each of the contents candidate regions is a contents region so that the contents regions can be extracted. According to the third embodiment, it is possible to extract the contents regions while eliminating the regions that are not contents regions (e.g., a region having a yellow mucous membrane and being in a color similar to the color of a contents regions) from the contents candidate regions extracted as the yellow regions. As a result, an advantageous effect is achieved where it is possible to properly determine the contents regions, which are an example of the unnecessary regions and to extract the contents regions with a high level of precision.

When the contents regions are extracted from the intraluminal image as described above, the process of extracting the abnormal part regions is applied to the intraluminal image in the same manner as explained in the first embodiment, before the intraluminal image is displayed on the display unit 13 as appropriate and presented to the user who is a medical doctor or the like. In this situation, by applying the third embodiment thereto, it is possible to specify a region that should be focused on ("focused region") while eliminating the extracted contents regions and to extract the abnormal part regions from the focused region. As a result, it is possible to realize the abnormal part detecting process with a high level of precision.

In the third embodiment described above, continuity with the adjacent region is first judged, with respect to the contents candidate region judged to be a saturated region. When it is determined that there is continuity, it is determined that the contents candidate region is not a contents region. On the contrary, when it is determined that there is no continuity, the texture feature data is calculated for the contents candidate region so as to judge whether the contents candidate region is a contents region based on the calculated texture feature data. Alternatively, however, it is acceptable to judge whether the contents candidate region is a contents region, by using only continuity with the adjacent region as the second feature data. As another alternative, it is acceptable to judge whether the contents candidate region is a contents region, by using only the texture feature data as the second feature data. As yet another alternative, it is also acceptable to perform a judging process first by using the texture feature data, before performing another judging process by using continuity with the adjacent region.

It is possible to realize the image processing apparatus 1 according to the first embodiment, the image processing apparatus 1b according to the second embodiment, and the image processing apparatus 1c according to the third embodiment by executing a program prepared in advance, in a computer system such as a personal computer, a work station, or the like. In the following sections, a computer system that has the same functions as those of the image processing apparatuses 1, 1b, and 1c explained in the first, the second, and the third embodiments and that executes the image processing programs 141, 141b, and 141c will be explained.

Figure 16:
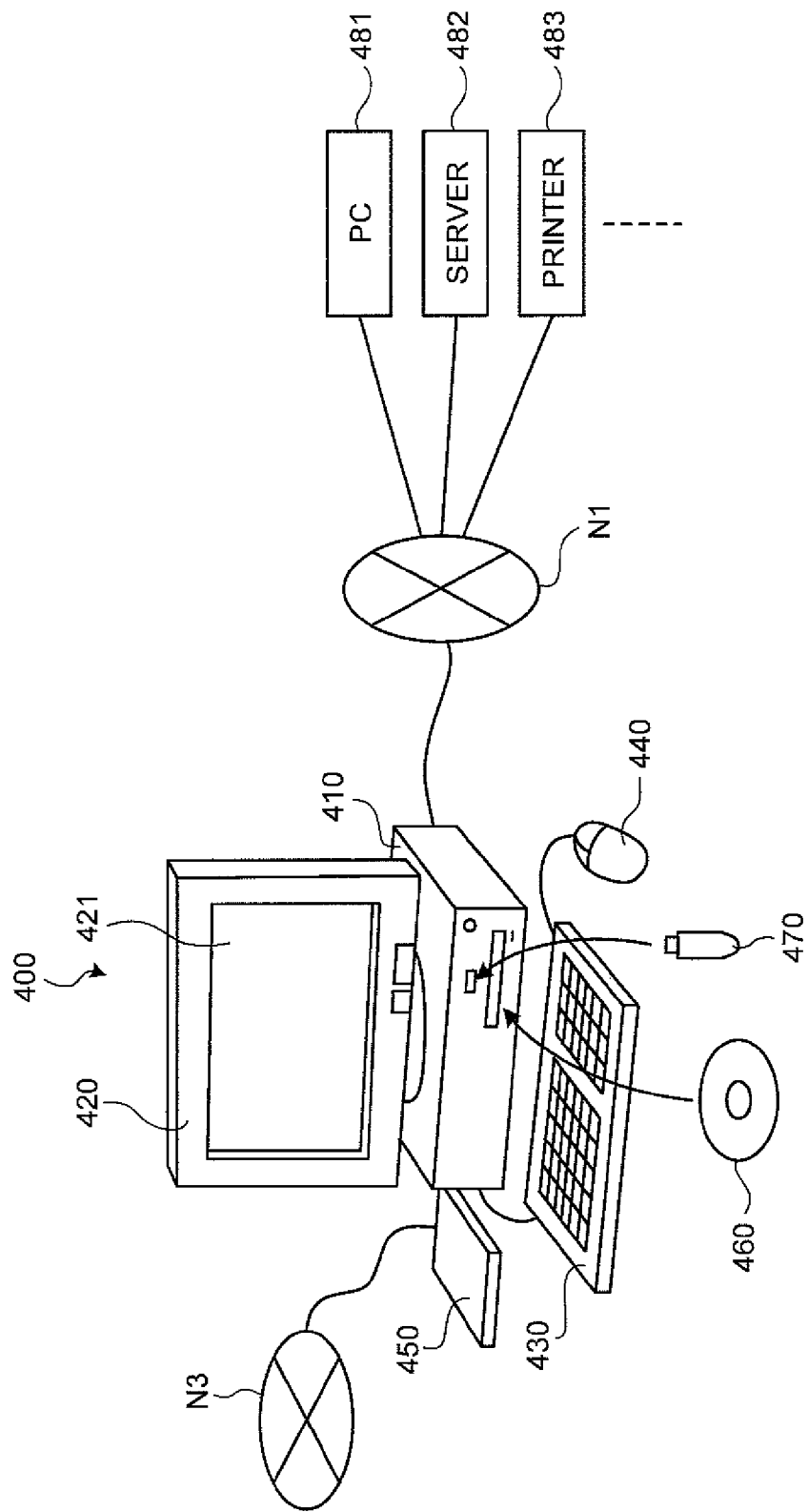
FIG. 16 is a system configuration diagram depicting a configuration of a computer system to which an aspect of the present invention is applied.
Figure 17:
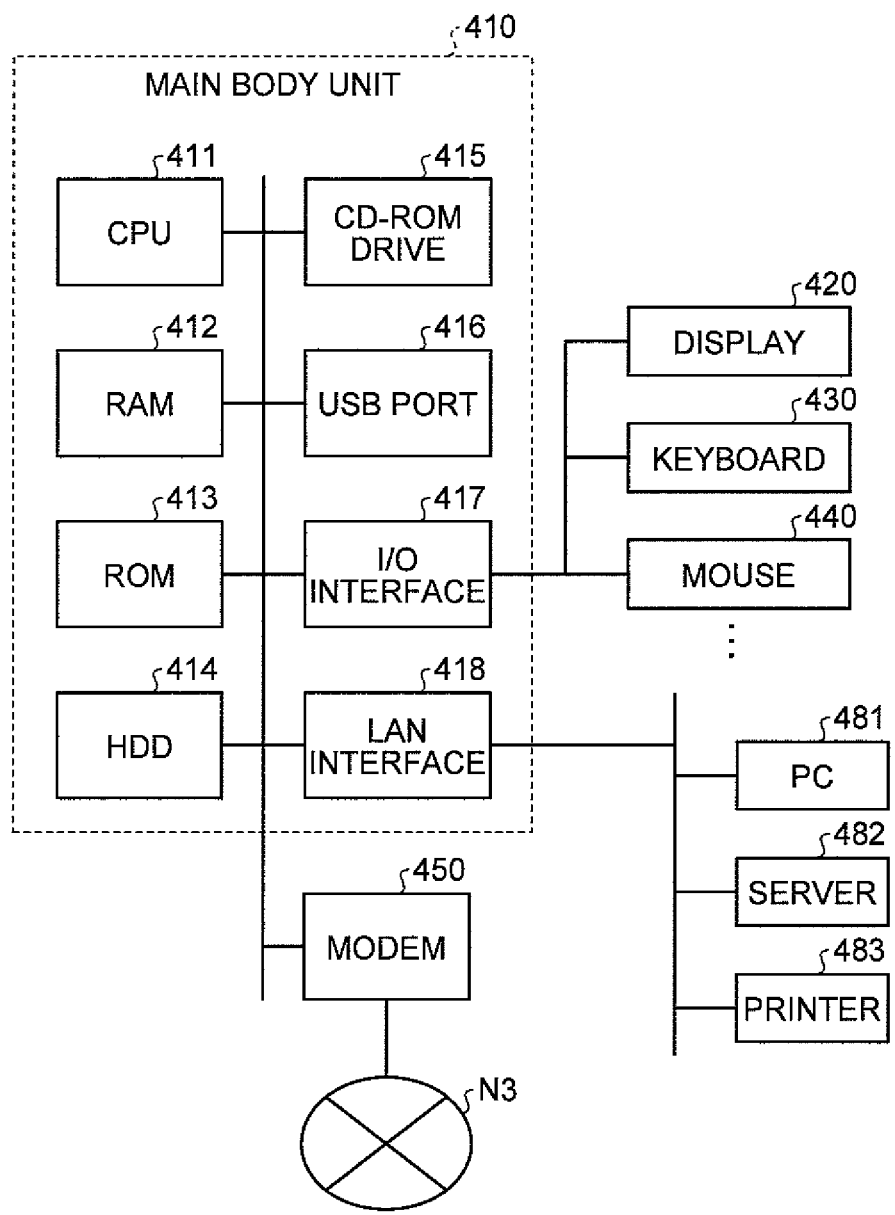
FIG. 17 is a block diagram of a main body unit included in the computer system shown in FIG. 16.

FIG. 16 is a system configuration diagram depicting a configuration of a computer system 400 according to the present modification example. FIG. 17 is a block diagram of a main body unit 410 included in the computer system 400. As shown in FIG. 16, the computer system 400 includes the main body unit 410, a display 420 for displaying information such as images on a display screen 421 according to an instruction from the main body unit 410; a keyboard 430 for inputting various types of information to the computer system 400; and a mouse 440 for specifying an arbitrary position on the display screen 421 of the display 420.

As shown in FIGS. 16 and 17, the main body unit 410 included in the computer system 400 includes: a CPU 411; a RAM 412; a ROM 413; a Hard Disk Drive (HDD) 414; a CD-ROM drive 415 that accepts a CD-ROM 460; a Universal Serial Bus (USB) port 416 to which a USB memory 470 can be detachably connected; an Input/Output (I/O) interface 417 to which the display 420, the keyboard 430, and the mouse 440 are connected; and a Local Area Network (LAN) interface 418 for establishing a connection to a local area network or a wide area network (LAN/WAN) N1.

Further, a modem 450 for establishing a connection to a public line N3 such as the Internet is connected to the computer system 400. Also, via the LAN interface 418 and the local area network/wide area network N1, other computer systems such as a personal computer (PC) 481, a server 482, a printer 483, and the like are connected to the computer system 400.

Further, the computer system 400 realizes an image processing apparatus (e.g., the image processing apparatus 1 according to the first embodiment, the image processing apparatus 1b according to the second embodiment, or the image processing apparatus 1c according to the third embodiment) by reading and executing an image processing program recorded on a predetermined recording medium (e.g., the image processing program 141 according to the first embodiment, the image processing program 141b according to the second embodiment, or the image processing program 141c according to the third embodiment). In this situation, the predetermined recording medium may be any recording medium having recorded thereon the image processing program readable by the computer system 400, and the examples include: a "portable physical medium" such as the CD-ROM 460 or the USB memory 470, as well as a Magneto-Optical (MO) disk, a Digital Versatile Disk (DVD), a Flexible Disk (FD), an optical magnetic disk, or an Integrated Circuit (IC) card; a "fixed physical medium" such as the HDD 414, the RAM 412, or the ROM 413 provided on the inside or the outside of the computer system 400; and a "communication medium" that stores therein a program for a short period of time when the program is transmitted, such as the public line N3 connected via the modem 450, or the local area network/wide area network N1 to which other computer systems such as PC 481 and the server 482 are connected.

In other words, the image processing program is recorded in a computer-readable manner on the recording medium such as the "portable physical medium", the "fixed physical medium", the "communication medium", or the like. The computer system 400 realizes the image processing apparatus by reading and executing the image processing program from such a recording medium. The image processing program does not necessarily have to be executed by the computer system 400. It is possible to apply the present invention to a situation where any of the other computer systems such as the PC 481 or the server 482 executes the image processing program or where two or more of the other computer systems execute the image processing program in collaboration with one another.

Further, the present invention is not limited to the first, the second, and the third embodiments and the modification examples described above. It is possible to form various inventions by combining, as appropriate, two or more of the constituent elements disclosed in the exemplary embodiments and the modification examples. For example, it is acceptable to form an invention by omitting one or more of the constituent elements disclosed in the exemplary embodiments and the modification examples. Alternatively, it is acceptable to form an invention by combining, as appropriate, two or more of the constituent elements disclosed in mutually-different exemplary embodiments and/or modification examples.

According to an aspect of the present invention described above, an advantageous effect is achieved where it is possible to properly judge whether a region is an unnecessary region and to extract the unnecessary regions from the intraluminal image with a high level of precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus that extracts an unnecessary region from an intraluminal image, the apparatus comprising:
   a processor; and
   a memory storing computer-readable instructions that, when executed by the processor, implement:
   a first judging unit that determines an unnecessary candidate region, on a basis of first feature data which is color feature data, based on color information of the intraluminal image; and
   a second judging unit that judges whether the unnecessary candidate region is the unnecessary region, based on second feature data, which is different from the color feature data, of the unnecessary candidate region,
   wherein the second judging unit includes:
   (a) a gradient feature data calculating unit that calculates gradient feature data of a surrounding region of the unnecessary candidate region, as the second feature data; and a gradient feature judging unit that judges whether the unnecessary candidate region is the unnecessary region, based on the gradient feature data; or
   (b) a saturation judging unit that judges whether the unnecessary candidate region is a saturated region or an unsaturated region, based on a level of a pixel value of a pixel in the unnecessary candidate region; and a saturated region judging unit that, with respect to the unnecessary candidate region judged to be the saturated region by the saturation judging unit, judges whether the unnecessary candidate region is the unnecessary region based on the second feature data.

2. The image processing apparatus according to claim 1, wherein
the gradient feature data calculating unit includes:
a gradient direction calculating unit that calculates a gradient direction in a surrounding of the unnecessary candidate region; and
a concentration degree calculating unit that calculates, as the second feature data, a concentration degree that is a value indicating a degree with which the gradient direction is oriented toward the unnecessary candidate region.

3. The image processing apparatus according to claim 1, wherein the saturation judging unit determines that the unnecessary candidate region is the saturated region, if a value of a predetermined color component of a pixel belonging to the unnecessary candidate region is equal to or larger than a predetermined threshold.

4. The image processing apparatus according to claim 1, wherein
the saturated region judging unit includes:
a texture feature data calculating unit that calculates texture feature data of the unnecessary candidate region judged to be the saturated region, as the second feature data; and
a texture feature judging unit that judges whether the unnecessary candidate region is the unnecessary region, based on the texture feature data.

5. The image processing apparatus according to claim 1, wherein
the saturated region judging unit includes:
a continuity judging unit that judges, with respect to the unnecessary candidate region judged to be the saturated region, whether the unnecessary candidate region has continuity with a region positioned adjacent thereto, as the second feature data; and
a judgment result obtaining unit that, if the continuity judging unit determines that the unnecessary candidate region has the continuity, judges whether the unnecessary candidate region is the unnecessary region by obtaining a judgment result for the adjacently-positioned region.

6. The image processing apparatus according to claim 5, wherein
the saturated region judging unit includes:
a texture feature data calculating unit that, if the continuity judging unit determines that the unnecessary candidate region does not have the continuity, calculates texture feature data of the unnecessary candidate region judged to be the saturated region, as the second feature data; and
a texture feature judging unit that judges whether the unnecessary candidate region is the unnecessary region, based on the texture feature data.

7. An image processing method for extracting an unnecessary region from an intraluminal image, the method comprising:
determining an unnecessary candidate region on a basis of first feature data which is color feature data, based on color information of the intraluminal image; and
judging whether the unnecessary candidate region is the unnecessary region, based on second feature data, which is different from the color feature data, of the unnecessary candidate region;
wherein the judging includes:
(a) calculating gradient feature data of a surrounding region of the unnecessary candidate region, as the second feature data; and judging whether the unnecessary candidate region is the unnecessary region, based on the gradient feature data; or
(b) judging whether the unnecessary candidate region is a saturated region or an unsaturated region, based on a level of a pixel value of a pixel in the unnecessary candidate region; and judging, with respect to the unnecessary candidate region judged to be the saturated region, whether the unnecessary candidate region is the unnecessary region based on the second feature data.

8. A computer-readable recording device with an executable program stored thereon, wherein the program instructs a processor to perform:
determining an unnecessary candidate region on a basis of first feature data which is color feature data, based on color information of the intraluminal image; and
judging whether the unnecessary candidate region is the unnecessary region, based on second feature data, which is different from the color feature data, of the unnecessary candidate region;
wherein the judging includes:
(a) calculating gradient feature data of a surrounding region of the unnecessary candidate region, as the second feature data; and judging whether the unnecessary candidate region is the unnecessary region, based on the gradient feature data; or
(b) judging whether the unnecessary candidate region is a saturated region or an unsaturated region, based on a level of a pixel value of a pixel in the unnecessary candidate region; and judging, with respect to the unnecessary candidate region judged to be the saturated region, whether the unnecessary candidate region is the unnecessary region based on the second feature data.

* * * * *